United States Patent
Liang et al.

(10) Patent No.: US 9,066,336 B2
(45) Date of Patent: Jun. 23, 2015

(54) METHOD AND SYSTEM FOR DETERMINING PHYSICAL UPLINK CONTROL CHANNEL RESOURCES

(75) Inventors: Chunli Liang, Shenzhen (CN); Bo Dai, Shenzhen (CN); Peng Hao, Shenzhen (CN); Weiwei Yang, Shenzhen (CN); Peng Zhu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 212 days.

(21) Appl. No.: 13/814,566

(22) PCT Filed: Jan. 20, 2011

(86) PCT No.: PCT/CN2011/070407
§ 371 (c)(1),
(2), (4) Date: Mar. 6, 2013

(87) PCT Pub. No.: WO2012/019445
PCT Pub. Date: Feb. 16, 2012

(65) Prior Publication Data
US 2013/0156003 A1    Jun. 20, 2013

(30) Foreign Application Priority Data
Aug. 12, 2010   (CN) .......................... 2010 1 0257101

(51) Int. Cl.
| | |
|---|---|
| H04W 72/04 | (2009.01) |
| H04L 5/00 | (2006.01) |
| H04W 52/14 | (2009.01) |
| H04L 27/32 | (2006.01) |
| H04L 1/00 | (2006.01) |
| H04L 1/16 | (2006.01) |

(52) U.S. Cl.
CPC ......... *H04W 72/0413* (2013.01); *H04L 5/0037* (2013.01); *H04W 52/146* (2013.01); *H04L 5/0053* (2013.01); *H04L 27/32* (2013.01); *H04L 1/0026* (2013.01); *H04L 1/1671* (2013.01)

(58) Field of Classification Search
CPC ... H04L 5/0053; H04L 5/0037; H04L 1/0026; H04L 1/1671; H04L 27/32; H04W 72/04135; H04W 72/0413; H04W 52/146
See application file for complete search history.

(56) References Cited

U.S. PATENT DOCUMENTS

| | | | |
|---|---|---|---|
| 2009/0125363 A1 | 5/2009 | Frederiksen et al. | |
| 2009/0197630 A1 | 8/2009 | Ahn et al. | |

(Continued)

FOREIGN PATENT DOCUMENTS

| | | |
|---|---|---|
| CN | 101720122 A | 6/2010 |
| CN | 101778419 A | 7/2010 |
| CN | 101917766 A | 12/2010 |

OTHER PUBLICATIONS

International Search Report for PCT/CN2011/070407 dated Apr. 13, 2011.

*Primary Examiner* — Alpus H Hsu
*Assistant Examiner* — Anthony Luo
(74) *Attorney, Agent, or Firm* — Ling and Yang Intellectual Property

(57) ABSTRACT

A method and system for determining physical uplink control channel resources are disclosed in the present document, a terminal determines a frequency domain resource, namely a location of a physical uplink control channel format 3 in total physical uplink control channel areas, used when the physical uplink control channel format 3 is sent according to parameters configured by a base station, and the location is determined according to a set location relationship. One location relationship is: from a bandwidth edge to a bandwidth center, the total physical uplink control channel areas including in turn a physical uplink control channel format 3 area, a physical uplink control channel format 2/2a/2b area, a hybrid resource block and a physical uplink control channel format 1/1a/1b area. In the present document, a feasible scheme is provided for determining resources of the physical uplink control channel format 3, which improves the system performance.

16 Claims, 8 Drawing Sheets

(56) References Cited

U.S. PATENT DOCUMENTS

2010/0309866 A1* 12/2010 Katayama et al. ............ 370/329
2010/0330999 A1* 12/2010 Larsson et al. ................ 455/439
2011/0013615 A1* 1/2011 Lee et al. ...................... 370/344
2011/0159914 A1* 6/2011 Chen et al. .................... 455/522
2011/0243066 A1* 10/2011 Nayeb Nazar et al. ....... 370/328

* cited by examiner

METHOD AND SYSTEM FOR DETERMINING PHYSICAL UPLINK CONTROL CHANNEL RESOURCES

TECHNICAL FIELD

The present invention relates to the field of communication, and particularly, to a method and system for determining physical uplink control channel resources in a wide bandwidth system.

BACKGROUND OF THE RELATED ART

In a Long Term Evolution (LTE) system, it is stipulated that when there is no uplink data required to be sent, physical uplink control channels are sent on fixed time-frequency resources. As shown in FIG. 1, one physical uplink control channel occupies one resource block in the frequency domain (one resource block occupies 12 sub-carriers) and lasts for two timeslots, namely one subframe (1 ms) in the time domain, and according to different cyclic prefixes used by the current subframe, the included symbolic numbers are different. In addition, the control channels perform frequency hopping on two timeslots so as to obtain diversity gain of the frequency domain. The physical uplink control channels of all User Equipments (UEs) in the cell are multiplexed through code division. Since the number of UEs which can be multiplexed on one resource block is limited, when the number of UEs required to send the physical uplink control channels simultaneously within the cell exceeds the number of users who can be multiplexed with one resource block, another resource block can be developed, that is, multiplexing of the physical uplink control channels of all the UEs in the cell is implemented by means of code division plus frequency division.

Currently, in the LTE system, the physical uplink control channels can support various uplink control signalings, including ACKnowledgement/Non-ACKnowledgement (ACK/NACK) information and Channel State Information (CSI) in which a Channel Quality Indicator (CQI), a Precoding Matrix Indicator (PMI), a Rank Indicator (RI), a Scheduling Request (SR) and a combination of them are included, wherein the ACK/NACK information and SR are sent using a control channel format 1, and the CSI is sent using a control channel format 2. Specifically, the control channel format 1 is used for sending the SR, and a control channel format 1a/1b is used for sending ACK/NACK information of 1 bit/2 bits; the control channel format 2 is used for sending the CSI and sending the CSI and ACK/NACK information simultaneously under a frame structure with a spread cyclic prefix; and a control channel format 2a/2b is used for sending the CSI and ACK/NACK information of 1 bit/2 bits simultaneously under a frame structure with an normal cyclic prefix. For easy to understand, all kinds of the physical uplink control channels are firstly introduced in brief here.

As shown in FIG. 2, under the frame structure with an normal cyclic prefix, the ACK/NACK information goes through Binary Phase Shift Keying (BPSK)/Quadrature Phase Shift Keying (QPSK) modulation and forms a modulation symbol, the modulation symbol firstly performs a spectrum spread with a spreading factor of 12 in the frequency domain (a spread spectrum sequence is a Constant Amplitude Zero Auto-Correlation (CAZAC) sequence with a length of 12), and goes through a time domain spreading of a Walsh sequence with a length of 4 in the time domain, and then is mapped to an information symbol corresponding to the control channel format 1a/1b as shown in FIG. 2, and finally forms a signal to be sent in one timeslot together with a reference signal. Therefore, within one resource block, the number of UEs which can multiplex to send the ACK/NACK simultaneously is decided by the number of shorter orthogonal sequences of time domain and the number of cyclic shifts of the CAZAC sequences permitted to be used in the same orthogonal code. When the cyclic prefix is the normal cyclic prefix, the number of available orthogonal sequences is 3, and when the cyclic prefix is the spread cyclic prefix, the number of available orthogonal sequences is 2, but the numbers of cyclic shifts of the CAZAC sequences permitted to be used in the same orthogonal sequence are different according to different application scenarios.

With regard to SR information, when there is an SR required to be sent, the SR information is fixedly modulated as $d(0)=1$, and then it is sent on the control channel format 1 by the same way as the ACK/NACK information.

As shown in FIG. 3, CSI information bits are coded to obtain 20 coding bits, and then go through the QPSK modulation to obtain 10 modulation symbols S0~S9, each modulation symbol performs spectrum spread with the spreading factor of 12 in the frequency domain (the spread spectrum sequence is the CAZAC sequence with the length of 12), and then is mapped to an information symbol corresponding to the control channel format 2 as shown in FIG. 3, and finally forms a signal to be sent in one timeslot together with a reference signal. Therefore, within one resource block, the number of UEs which can multiplex to send the CQI simultaneously is decided by the number of cyclic shifts of the CAZAC sequences permitted to be used.

As shown in FIG. 4, when it is required to send the ACK/NACK and uplink channel Sounding Reference Signal (SRS) simultaneously on the same subframe and simultaneous transmission of the ACK/NACK and SRS is permitted by parameters configured by the higher layer, a physical uplink control channel format 1/1a/1b needs to use a truncated format, that is, the last data symbol of the subframe needs to be truncated, and the truncated data symbol is used for sending the SRS. Therefore, with regard to the truncated control channel format 1/1a/1b, a time domain spread sequence length of a data symbol of the second timeslot thereof will change from 4 to 3, and meanwhile, the used time domain spread sequence changes from a 4-order Walsh code to a 3-order Discrete Fourier Transformation (DFT) sequence.

In a general case, a UE sending the ACK/NACK and a UE sending the CSI use different resource blocks, but it is also supported that the ACK/NACK and CSI of different UEs are sent on the same resource block in the LTE currently, and it is stipulated that there is only one such resource block at most, and it is called as a hybrid resource block here, and when a parameter configured by the higher layer $N_{CS}^{(1)}>0$, it is indicated that the hybrid resource block exists.

In the LTE, the resource allocation of physical uplink control channels is as shown in FIG. 5, from the bandwidth edge to the bandwidth center, they are the control channel format 2/2a/2b area, the hybrid resource block (if configured) and control channel format 1/1a/1b area in sequence. Wherein, the physical uplink control channel resource of the control channel format 2/2a/2b area is represented with a channel index $n_{PUCCH}^{(2)}$ and it is configured semi-statically by the higher layer signaling, and the physical uplink control channel resource of the control channel format 1/1a/1b area is represented with a channel index $n_{PUCCH}^{(1)}$, and they can be configured semi-statically by the higher layer signaling and also can be indicated implicitly and dynamically through a downlink control channel.

In order to satisfy the requirements of International Telecommunication Union-Advanced (ITU-Advanced), a Long Term Evolution Advanced (LTE-A) system, as an advanced standard of the LTE, is required to support a wider system bandwidth (up to 100 MHz) and is required to be downward compatible with the existing standard of the LTE. Based on the existing LTE system, the bandwidth of the LTE system can be combined to obtain a wider bandwidth, this technology is called as a Carrier Aggregation (CA) technology, and the technology can improve spectrum efficiency of an International Mobile Telecommunications-Advanced (IMT-Advanced) system and relieve the shortage of spectrum resources, thereby optimizing the utilization of the spectrum resources.

When the LTE-A uses the carrier aggregation technology, and when the UE configures 4 downlink component carriers, the UE is required to feed back the ACK/NACKs of these 4 downlink component carriers. If the UE is required to feed back the ACK/NACK of each code word in the case of Multiple Input Multiple Output (MIMO), when the UE configures 4 downlink component carriers, the UE is required to feed back 8 ACK/NACKs. It can be seen from the above analysis that, 2-bit information can be carried at most when using the control channel format 1a/1b used by the ACK/NACK information. In Time Division Multiplexing (TDD) of the LTE, when the ACK/NACK feeds back ACK/NACK message by means of multiplexing, through the way of combining the channel selection and control channel format 1b, the ACK/NACK message which can be carried is enabled to support 4 bits at most, but with regard to more feedback bits, the current control channel formats of the LTE cannot support them. Therefore, it is extremely necessary to introduce new control channel formats. In the current LTE-A discussion, one conclusion is to introduce a format based on Discrete Fourier Transformation Spread-Orthogonal Frequency Division Multiplexing (DFT Spread-OFDM), which is used for the UEs which support more than 4 bits to perform the feedback of the ACK/NACK message. For an easy description, this new format based on the DFT-S-OFDM is called as a control channel format 3. At present, there is not a certain scheme with respect to a resource allocation method and a channelization method for the control channel format 3.

SUMMARY OF THE INVENTION

The main object of the present invention is to provide a method and system for determining physical uplink control channel resources, which provides a feasible scheme for determining resources for a physical uplink control channel format 3, thereby improving the system performance.

In order to solve the above technical problem, the present document provides a method for determining physical uplink control channel resources, which comprises: a terminal determining a frequency domain resource and a code domain resource used when a physical uplink control channel format 3 is sent according to parameters configured by a base station.

The above method can further be characterized in that:
the frequency domain resource used by the physical uplink control channel format 3 is a location of the physical uplink control channel format 3 in total physical uplink control channel areas; and the location is determined according to one of following 5 location relationships:

location relationship 1: from a bandwidth edge to a bandwidth center, the total physical uplink control channel areas comprising in turn a physical uplink control channel format 3 area, a physical uplink control channel format 2/2a/2b area, a hybrid resource block and a physical uplink control channel format 1/1a/1b area;

location relationship 2: from a bandwidth edge to a bandwidth center, the total physical uplink control channel areas comprising in turn a physical uplink control channel format 2/2a/2b area, a physical uplink control channel format 3 area, a hybrid resource block and a physical uplink control channel format 1/1a/1b area;

location relationship 3: from a bandwidth edge to a bandwidth center, the total physical uplink control channel areas comprising in turn a physical uplink control channel format 2/2a/2b area, a hybrid resource block, a physical uplink control channel format 3 area and a physical uplink control channel format 1/1a/1b area;

location relationship 4: from a bandwidth edge to a bandwidth center, the total physical uplink control channel areas comprising in turn a physical uplink control channel format 2/2a/2b area, a hybrid resource block, a physical uplink control channel format 1/1a/1b area and a physical uplink control channel format 3 area;

location relationship 5: from a bandwidth edge to a bandwidth center, the total physical uplink control channel areas comprising in turn an area in which a physical uplink control channel format 3 and a physical uplink control channel format 2/2a/2b appear alternately, a hybrid resource block and a physical uplink control channel format 1/1a/1b area;

wherein, in a case that no hybrid resource block resource is configured, no hybrid resource block is contained in the above location relationships.

The above method can further be characterized in that:
the step of a terminal determining a frequency domain resource and a code domain resource used when a physical uplink control channel format 3 is sent according to parameters configured by a base station comprises:

the terminal obtaining a control channel index $n_{PUCCH}^{(3)}$ used when the physical uplink control channel format 3 is sent;

according to the control channel index $n_{PUCCH}^{(3)}$, the location of the physical uplink control channel format 3 in the total physical uplink control channel areas and a number of channels $N_{CH}$ of the physical uplink control channel format 3 which can be multiplexed within one resource block, the terminal determining a virtual frequency domain resource block index m of the physical uplink control channel format 3;

according to a mapping relationship between the virtual frequency domain resource block index m and a physical frequency domain resource block index, the terminal obtaining a physical frequency domain resource block index $n_{PRB}^{(3)}$ practically used when the physical uplink control channel format 3 is sent;

according to the control channel index $n_{PUCCH}^{(3)}$ and the number of channels $N_{CH}$ of the physical uplink control channel format 3 which can be multiplexed within one resource block, the terminal determining a relative channel index $n'(n_s)$ ($n_s$ mod 2=0) of the channel index $n_{PUCCH}^{(3)}$ within one resource block on a first timeslot within a subframe; and according to the $n'(n_s)$, the terminal determining the code domain resource of the physical uplink control channel format 3, namely a sequence index $n_{OC}^{(3)}(n_s)$ corresponding to a time domain spread sequence and a sequence index $n_{RS,CS}^{(3)}(n_s)$ corresponding to a reference signal sequence used when the physical uplink control channel format 3 is sent.

The above method can further be characterized in that:
a value of the number of channels $N_{CH}$ of the physical uplink control channel format 3 which can be multiplexed within one resource block is related to a number of channels $N_{CH}^{OC}$ which can be multiplexed through the time domain spread sequence and a number of channels $N_{CH}^{RS}$ which can be multiplexed through the reference signal sequence; preferably, the value of the $N_{CH}$ is a minimum of the $N_{CH}^{OC}$ and the $N_{CH}^{RS}$.

The above method can further be characterized in that:

the number of channels $N_{CH}^{RS}$ which can be multiplexed through the reference signal sequence is related to a cyclic shift interval $\Delta_{shift}^{PUCCH}$ used by the reference signal sequence configured by the base station currently; specifically, $N_{CH}^{RS} = \lfloor 12/\Delta_{shift}^{PUCCH} \rfloor$; or when the reference signal sequence uses a time domain spreading, the number of channels $N_{CH}^{RS}$ which can be multiplexed through the reference signal sequence is related to a cyclic shift interval $\Delta_{shift}^{PUCCH}$ used by the reference signal sequence configured by the base station currently and a time domain spread sequence length of a reference signal; specifically, $N_{CH}^{RS} \lfloor 12/\Delta_{shift}^{PUCCH} \rfloor * n_{RS,OC}^{(3)}$.

The above method can further be characterized in that:

the time domain spread sequence length of the reference signal is related to a data-reference signal structure used by the physical uplink control channel format 3, and specifically, the time domain spread sequence length of the reference signal is equal to a number of symbols $n_{RS,OC}^{(3)}$ of the reference signal in the data-reference signal structure used by the physical uplink control channel format 3.

The above method can further be characterized in that:

when the physical uplink control channel format 3 uses code resource hopping based on timeslots, a relative channel index $n'(n_s)(n_s \bmod 2=1)$ on a second timeslot of the subframe has a mapping relationship with the relative channel index $n'(n_s)(n_s \bmod 2=0)$ on the first timeslot; and when the physical uplink control channel format 3 does not use the code resource hopping based on timeslots, the relative channel index $n'(n_s)(n_s \bmod 2=1)$ on the second timeslot of the subframe is equal to the relative channel index $n'(n_s)(n_s \bmod 2=0)$ on the first timeslot.

The above method can further be characterized in that:

when the reference signal sequence uses cyclic shift hopping based on symbols, a sequence index used by the reference signal sequence on each time domain symbol has a mapping relationship with $n_{RS,CS}^{(3)}(n_s)$ and with a cyclic shift hopping pattern based on symbols $n_{cs}(n_s,l)$, wherein l is an index of the reference signal corresponding to the time domain symbol within one timeslot; and when the reference signal sequence does not use the cyclic shift hopping based on symbols, the sequence index used by the reference signal sequence on each time domain symbol is the $n_{RS,CS}^{(3)}(n_s)$.

The above method can further be characterized in that:

the control channel index $n_{PUCCH}^{(3)}$ used when the terminal sends the physical uplink control channel format 3 is obtained by means of higher layer signaling configuration, or is obtained by means of implicit indication, or is obtained by means of explicit indication of downlink control information.

The above method can further be characterized in that:

the physical uplink control channel format 3 refers to a physical uplink control channel based on a discrete Fourier transformation spread-orthogonal frequency division multiplexing structure.

The above method can further be characterized in that:

the physical uplink control channel format 3 is used for sending message at least including acknowledgement/non-acknowledgement information.

In order to solve the above technical problem, the present document further provides a method for determining physical uplink control channel resources, which comprises: a terminal determining a frequency domain resource, namely a location of a physical uplink control channel format 3 in the total physical uplink control channel areas, used when the physical uplink control channel format 3 is sent according to parameters configured by a base station, wherein the location is determined according to one of following 3 location relationships:

location relationship 1: from a bandwidth edge to a bandwidth center, the total physical uplink control channel areas comprising in turn a physical uplink control channel format 3 area, a physical uplink control channel format 2/2a/2b area, a hybrid resource block and a physical uplink control channel format 1/1a/1b area;

location relationship 2: from a bandwidth edge to a bandwidth center, the total physical uplink control channel areas comprising in turn a physical uplink control channel format 2/2a/2b area, a physical uplink control channel format 3 area, a hybrid resource block and a physical uplink control channel format 1/1a/1b area;

location relationship 3: from a bandwidth edge to a bandwidth center, the total physical uplink control channel areas comprising in turn a physical uplink control channel format 2/2a/2b area, a hybrid resource block, a physical uplink control channel format 3 area and a physical uplink control channel format 1/1a/1b area.

The above method can further be characterized in that:

the terminal determines a virtual frequency domain resource block index m of the physical uplink control channel format 3; wherein, when the base station configures $N_{RB}^{(3)}$, $m = N_{RB}^{(2)} - N_{RB}^{(3)} + \lfloor n_{PUCCH}^{(3)}/N_{CH} \rfloor$;

when the base station configures $N_{PUCCH}^{(3)}$, $m = N_{PUCCH}^{(3)} + \lfloor n_{PUCCH}^{(3)}/N_{CH} \rfloor$;

when the base station does not configure the $N_{RB}^{(3)}$ and $N_{PUCCH}^{(3)}$, $m = N_{RB}^{(2)} - 1 - \lfloor n_{PUCCH}^{(3)}/N_{CH} \rfloor$ or $m = \lfloor n_{PUCCH}^{(3)}/N_{CH} \rfloor$ or $$m = N_{RB}^{(2)} + \left\lceil \frac{N_{CS}^{(1)}}{8} \right\rceil + \lfloor n_{PUCCH}^{(3)}/N_{CH} \rfloor;$$

wherein, $N_{RB}^{(2)}$ represents a total number of physical resource blocks occupied by a physical uplink control channel format 2/2a/2b and the physical uplink control channel format 3, or $N_{RB}^{(2)}$ represents a number of physical resource blocks occupied by the physical uplink control channel format 2/2a/2b; $N_{PRB}^{(3)}$ represents a number of physical resource blocks occupied by the physical uplink control channel format 3; $n_{PUCCH}^{(3)}$ represents a channel index, used when the physical uplink control channel format 3 is sent, obtained by the terminal; $N_{CH}$ represents a number of channels of the physical uplink control channel format 3 which can be multiplexed within one resource block; $N_{PUCCH}^{(3)}$ represents a start physical resource block index of the physical uplink control channel format 3 area in a frequency domain; and $N_{CS}^{(1)}$ represents a number of cyclic shifts used for sending a physical uplink control channel format 1/1a/1b in the hybrid resource block.

The above method can further be characterized in that:

according to a mapping relationship between the virtual frequency domain resource block index m and a physical frequency domain resource block index, the terminal obtains a physical frequency domain resource block index $n_{PRB}^{(3)}$ practically used when the physical uplink control channel format 3 is sent, when a value of $m+n_s \bmod 2$ is an integral multiple of 2, $$n_{PRB}^{(3)} = \left\lfloor \frac{m}{2} \right\rfloor,$$

and when the value of $m+n_s$ mod 2 is not an integral multiple of 2, $$n_{PRB}^{(3)} = N_{RB}^{UL} - 1 - \left\lfloor \frac{m}{2} \right\rfloor,$$

wherein, mod represents modular arithmetic, and $N_{RB}^{UL}$ represents a number of physical resource blocks contained in uplink bandwidth.

The above method can further be characterized in that:
the terminal determines a code domain resource used when the physical uplink control channel format 3 is sent; and the step of the terminal determining a code domain resource used when the physical uplink control channel format 3 is sent comprises: according to the number of channels $N_{CH}$ of the physical uplink control channel format 3 which can be multiplexed within one resource block, the terminal determining a relative channel index $n'(n_s)$ ($n_s$ mod 2=0) of the channel index $n_{PUCCH}^{(3)}$ within one resource block on a first timeslot within a subframe, which is specifically as follows: $n'(n_s) = \mathrm{mod}(n_{PUCCH}^{(3)}, N_{CH})$, and $N_{CH}$ represents the number of channels of the physical uplink control channel format 3 which can be multiplexed within one resource block.

The above method can further be characterized in that:
the step of the terminal determining a code domain resource used when the physical uplink control channel format 3 is sent further comprises: according to the $n'(n_s)$, the terminal determining the code domain resource of the physical uplink control channel format 3, namely a sequence index $n_{OC}^{(3)}(n_s)$ corresponding to a time domain spread sequence and a sequence index $n_{RS,CS}^{(3)}(n_s)$ corresponding to a reference signal sequence used when the physical uplink control channel format 3 is sent, a value of the $n_{OC}^{(3)}(n_s)$ is a value of the $n'(n_s)$, a value of the $n_{RS,CS}^{(3)}(n_s)$ is a product of the $n'(n_s)$ and $\Delta P_{shift}^{PUCCH}$, the $\Delta_{shift}^{PUCCH}$ represents a cyclic shift interval of a constant amplitude zero auto-correlation sequence, and values of the $\Delta_{shift}^{PUCCH}$ are 1, 2 and 3.

In order to solve the above technical problem, the present document further provides a system for determining physical uplink control channel resources, which comprises:
a terminal, configured to determine a frequency domain resource, namely a location of a physical uplink control channel format 3 in total physical uplink control channel areas, used when the physical uplink control channel format 3 is sent according to parameters configured by a base station, wherein the location is determined according to one of following 3 location relationships:

location relationship 1: from a bandwidth edge to a bandwidth center, the total physical uplink control channel areas comprising in turn a physical uplink control channel format 3 area, a physical uplink control channel format 2/2a/2b area, a hybrid resource block and a physical uplink control channel format 1/1a/1b area;

location relationship 2: from a bandwidth edge to a bandwidth center, the total physical uplink control channel areas comprising in turn a physical uplink control channel format 2/2a/2b area, a physical uplink control channel format 3 area, a hybrid resource block and a physical uplink control channel format 1/1a/1b area;

location relationship 3: from a bandwidth edge to a bandwidth center, the total physical uplink control channel areas comprising in turn a physical uplink control channel format 2/2a/2b area, a hybrid resource block, a physical uplink control channel format 3 area and a physical uplink control channel format 1/1a/1b area.

The above system can further be characterized in that:
the terminal is further configured to determine a virtual frequency domain resource block index m of the physical uplink control channel format 3; wherein,
when the base station configures $N_{RB}^{(3)}$, $m = N_{RB}^{(2)} - N_{RB}^{(3)} + \lfloor n_{PUCCH}^{(3)} / N_{CH} \rfloor$;
when the base station configures $N_{PUCCH}^{(3)}$; $m = N_{PUCCH}^{(3)} + \lfloor n_{PUCCH}^{(3)} / N_{CH} \rfloor$;
when the base station does not configure the $N_{PRB}^{(3)}$ and $N_{PUCCH}^{(3)}$, $m = N_{RB}^{(2)} - 1 - \lfloor n_{PUCCH}^{(3)} / N_{CH} \rfloor$ or $m = \lfloor n_{PUCCH}^{(3)} / N_{CH} \rfloor$ or $$m = N_{RB}^{(2)} + \left\lceil \frac{N_{CS}^{(1)}}{8} \right\rceil + \lfloor n_{PUCCH}^{(3)} / N_{CH} \rfloor;$$

wherein, $N_{RB}^{(2)}$ represents a total number of physical resource blocks occupied by a physical uplink control channel format 2/2a/2b and the physical uplink control channel format 3, or $N_{RB}^{(2)}$ represents a number of physical resource blocks occupied by the physical uplink control channel format 2/2a/2b;

$N_{RB}^{(3)}$ represents a number of physical resource blocks occupied by the physical uplink control channel format 3;
$n_{PUCCH}^{(3)}$ represents a channel index, used when the physical uplink control channel format 3 is sent, obtained by the terminal;

$N_{CH}$ represents a number of channels of the physical uplink control channel format 3 which can be multiplexed within one resource block; $N_{PUCCH}^{(3)}$ represents a start physical resource block index of the physical uplink control channel format 3 area in a frequency domain; and $N_{CS}^{(1)}$ represents a number of cyclic shifts used for sending a physical uplink control channel format 1/1a/1b in the hybrid resource block.

The above system can further be characterized in that:
the terminal is further configured to: according to a mapping relationship between the virtual frequency domain resource block index m and a physical frequency domain resource block index, obtain a physical frequency domain resource block index $n_{PRB}^{(3)}$ practically used when the physical uplink control channel format 3 is sent, when a value of $m+n_s$ mod 2 is an integral multiple of 2, $$n_{PRB}^{(3)} = \left\lfloor \frac{m}{2} \right\rfloor,$$

and when the value of $m+n_s$ mod 2 is not an integral multiple of 2, $$n_{PRB}^{(3)} = N_{RB}^{UL} - 1 - \left\lfloor \frac{m}{2} \right\rfloor,$$

wherein, mod represents modular arithmetic, and $N_{RB}^{UL}$ represents a number of physical resource blocks contained in uplink bandwidth.

The above system can further be characterized in that:
the terminal is further configured to: according to the number of channels $N_{CH}$ of the physical uplink control channel format 3 which can be multiplexed within one resource block, determine a relative channel index n'($n_s$)($n_s$ mod 2=0) of the channel index $n_{PUCCH}^{(3)}$ within one resource block on a first timeslot within a subframe, which is specifically as follows: n'($n_s$)=mod($n_{PUCCH}^{(3)}$, $N_{CH}$), and $N_{CH}$ represents the number of channels of the physical uplink control channel format 3 which can be multiplexed within one resource block.

The above system can further be characterized in that:

the terminal is further configured to: according to the n'($n_s$), determine the code domain resource of the physical uplink control channel format 3, namely a sequence index $n_{OC}^{(3)}(n_s)$ corresponding to a time domain spread sequence and a sequence index $n_{RS,CS}^{(3)}(n_s)$ corresponding to a reference signal sequence used when the physical uplink control channel format 3 is sent, a value of the $n_{OC}^{(3)}(n_s)$ is a value of the n'($n_s$), a value of the $n_{RS,CS}^{(3)}(n_s)$ is a product of the n'($n_s$) and $\Delta_{shift}^{PUCCH}$, the $\Delta_{shift}^{PUCCH}$ represents a cyclic shift interval of a constant amplitude zero auto-correlation sequence, and values of the $\Delta_{shift}^{PUCCH}$ are 1, 2 and 3.

In the present invention, a feasible scheme is provided for determining resources for the physical uplink control channel format 3, which improves the system performance.

BRIEF DESCRIPTION OF DRAWINGS

FIG. 7-1 is a schematic diagram of one location relationship of the physical uplink control channel format 3 in the physical uplink control channel areas according to the example 2.

FIG. 7-2 is a schematic diagram of another location relationship of the physical uplink control channel format 3 in the physical uplink control channel areas according to the example 2.

FIG. 7-3 is a schematic diagram of another location relationship of the physical uplink control channel format 3 in the physical uplink control channel areas according to the example 2.

FIG. 7-4 is a schematic diagram of another location relationship of the physical uplink control channel format 3 in the physical uplink control channel areas according to the example 2.

FIG. 10-1 is a schematic diagram of one location relationship of the physical uplink control channel format 3 in the physical uplink control channel areas according to the example 5.

FIG. 10-2 is a schematic diagram of another location relationship of the physical uplink control channel format 3 in the physical uplink control channel areas according to the example 5.

PREFERRED EMBODIMENTS OF THE PRESENT INVENTION

Figure 1:
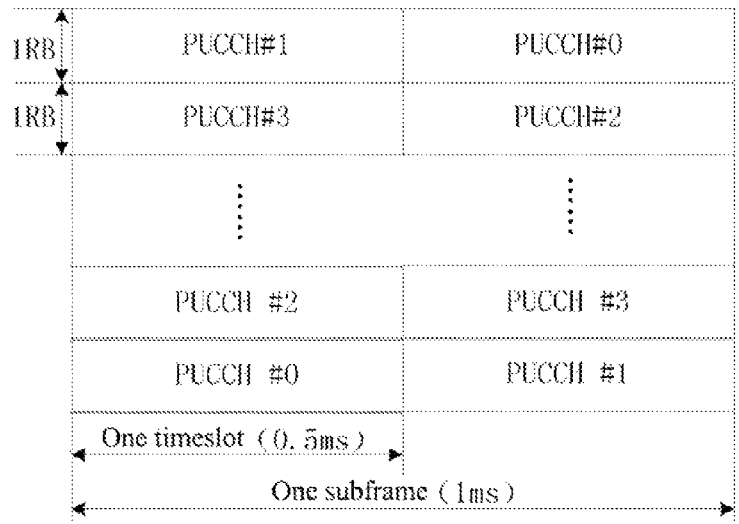
FIG. 1 is a schematic diagram of a structure of the physical uplink control channel.

A base station configures parameters in the present invention, and a terminal determines a frequency domain resource and a code domain resource used when a physical uplink control channel format 3 is sent according to the parameters configured by the base station. The scheme for a system constituted by the terminal and base station completing the determination for a physical uplink control channel resource is the same as the scheme of the following method.

In the method for determining physical uplink control channel resources according to the present document, the terminal determines a frequency domain resource and a code domain resource used when the physical uplink control channel format 3 is sent according to the parameters configured by the base station.

The frequency domain resource of the physical uplink control channel format 3 refers to a frequency domain resource block index used when the terminal sends the physical uplink control channel format 3, and one physical uplink control channel format 3 occupies one physical resource block, namely 12 subcarriers, in a frequency domain. The code domain resource of the physical uplink control channel format 3 refers to a time domain spread sequence and a reference signal sequence used when the terminal sends the physical uplink control channel format 3.

The physical uplink control channel format 3 refers to a physical uplink control channel based on a discrete Fourier transformation spread-orthogonal frequency division multiplexing structure. The physical uplink control channel format 3 is used for sending message at least including acknowledgement/non-acknowledgement information, and also can be used for sending Channel State Information (CSI) of which the number of feedback bits exceeds 11 bits.

the frequency domain resource used by the physical uplink control channel format 3 is a location of the physical uplink control channel format 3 in total physical uplink control channel areas, and the location is determined according to one of the following 5 location relationships:

location relationship 1: from a bandwidth edge to a bandwidth center, the total physical uplink control channel areas comprising in turn a physical uplink control channel format 3 area, a physical uplink control channel format 2/2a/2b area, a hybrid resource block and a physical uplink control channel format 1/1a/1b area;

location relationship 2: from a bandwidth edge to a bandwidth center, the total physical uplink control channel areas comprising in turn a physical uplink control channel format 2/2a/2b area, a physical uplink control channel format 3 area, a hybrid resource block and a physical uplink control channel format 1/1a/1b area;

location relationship 3: from a bandwidth edge to a bandwidth center, the total physical uplink control channel areas comprising in turn a physical uplink control channel format 2/2a/2b area, a hybrid resource block, a physical uplink control channel format 3 area and a physical uplink control channel format 1/1a/1b area;

location relationship 4: from a bandwidth edge to a bandwidth center, the total physical uplink control channel areas comprising in turn a physical uplink control channel format 2/2a/2b area, a hybrid resource block, a physical uplink control channel format 1/1a/1b area and a physical uplink control channel format 3 area;

location relationship 5: from a bandwidth edge to a bandwidth center, the total physical uplink control channel areas comprising in turn an area in which the physical uplink control channel format 3 and a physical uplink control channel format 2/2a/2b appear alternately, a hybrid resource block and a physical uplink control channel format 1/1a/1b area.

Wherein, in a case that no hybrid resource block resource is configured, the hybrid resource block is not contained in the above location relationships.

Wherein, when the base station configures the relevant parameters used for determining the physical uplink control channel resources, it is required to consider the location relationship of all kinds of the physical uplink control channels in the total physical uplink control channel areas; wherein, the location relationship 2 is a preferred scheme.

The method specifically includes the following steps:

the terminal obtaining a control channel index $n_{PUCCH}^{(3)}$ used when the physical uplink control channel format 3 is sent;

the terminal determining a virtual frequency domain resource block index in of the physical uplink control channel format 3 according to the control channel index $n_{PUCCH}^{(3)}$, the location of the physical uplink control channel format 3 in total physical uplink control channel areas and a number of channels $N_{CH}$ of the physical uplink control channel format 3 which can be multiplexed within one resource block, and then obtaining a physical frequency domain resource block index $n_{PRB}^{(3)}$, practically used when the physical uplink control channel format 3 is sent according to a mapping relationship between the virtual frequency domain resource block index m and a physical frequency domain resource block index;

the terminal determining a relative channel index $n'(n_s)$ ($n_s$ mod 2=0) of the control channel index $n_{PUCCH}^{(3)}$ within one resource block on the first timeslot within a subframe according to the control channel index $n_{PUCCH}^{(3)}$ and the number of channels $N_{CH}$ of the physical uplink control channel format 3 which can be multiplexed within one resource block; and the terminal determining a code domain resource of the physical uplink control channel format 3, namely a sequence index $n_{OC}^{(3)}(n_s)$ corresponding to a time domain spread sequence and a sequence index $n_{RS,CS}^{(3)}(n_s)$ corresponding to a reference signal sequence used when the physical uplink control channel format 3 is sent, according to the $n'(n_s)$.

Wherein, the control channel index $n_{PUCCH}^{(3)}$ used when the terminal sends the physical uplink control channel format 3 is obtained by means of higher layer signaling configuration, or is obtained by means of implicit indication, or is obtained by means of explicit indication of downlink control information.

Wherein, a value of the number of channels $N_{CH}$ of the physical uplink control channel format 3 which can be multiplexed within one resource block is related to a number of channels $N_{CH}^{OC}$ which can be multiplexed through the time domain spread sequence and a number of channels $N_{CH}^{RS}$ which can be multiplexed through the reference signal sequence; specifically, the value of the $N_{CH}$ is a minimum of the $N_{CH}^{OC}$ and the $N_{CH}^{RS}$ that is, $N_{CH}=\min\{N_{CH}^{OC}, N_{CH}^{RS}\}$.

The number of channels $N_{CH}^{OC}$ which can be multiplexed through the time domain spread sequence is related to a time domain spread sequence length.

The time domain spread sequence length is related to a cyclic prefix type used by the physical uplink control channel format 3, a data-reference signal structure and whether the physical uplink control channel format 3 uses a truncated structure.

The truncated structure of the physical uplink control channel format 3 refers to a structure used when the physical uplink control channel format 3 and an uplink Sounding Reference Signal (SRS) are sent simultaneously.

As for the time domain spread sequences, different sequences are used according to different sequence lengths thereof. When the time domain spread sequence length is 3, a 3-order Discrete Fourier Transformation (DFT) sequence is used; when the time domain spread sequence length is 4, a 4-order Walsh sequence is used; and when the time domain spread sequence length is 5, a 5-order DFT sequence or Constant Amplitude Zero Auto-Correlation (CAZAC) sequence is used.

The number of channels $N_{CH}^{RS}$ which can be multiplexed through the reference signal sequence is related to a cyclic shift interval $\Delta_{shift}^{PUCCH}$ used by the reference signal sequence configured by the base station currently; specifically, $N_{CH}^{RS}=\lfloor 12/\Delta_{shift}^{PUCCH} \rfloor$; or when the reference signal sequence uses the time domain spreading, the number of channels $N_{CH}^{RS}$ which can be multiplexed through the reference signal sequence is related to a cyclic shift interval $\Delta_{shift}^{PUCCH}$ used by the reference signal sequence configured by the base station currently and a time domain spread sequence length of a reference signal; specifically, $N_{CH}^{RS}=\lfloor 12/\Delta_{shift}^{PUCCH} \rfloor * n_{RS,OC}^{(3)}$.

The time domain spread sequence length of the reference signal is related to the data-reference signal structure used by the physical uplink control channel format 3, and specifically, the time domain spread sequence length of the reference signal is equal to a number $n_{RS,OC}^{(3)}$ of symbols of the reference signal in the data-reference signal structure used by the physical uplink control channel format 3.

When the physical uplink control channel format 3 uses code resource hopping based on timeslots, a relative channel index $n'(n_s)(n_s$ mod 2=1) on a second timeslot of the subframe has a mapping relationship with the relative channel index $n'(n_s)(n_s$ mod 2=0) on the first timeslot; and when the physical uplink control channel format 3 does not use the code resource hopping based on timeslots, the relative channel index $n'(n_s)(n_s$ mod 2=1) on the second timeslot of the subframe is equal to the relative channel index $n'(n_s)(n_s$ mod 2=0) on the first timeslot.

When the reference signal sequence uses cyclic shift hopping based on symbols, a sequence index used by the reference signal sequence on each time domain symbol has a mapping relationship with $n_{RS,CS}^{(3)}(n_s)$ and with a cyclic shift hopping pattern $n_{cs}(n_s,l)$ based on symbols, wherein l is an index of the reference signal corresponding to the time domain symbol within one timeslot; and when the reference signal sequence does not use the cyclic shift hopping based on symbols, the sequence index used by the reference signal sequence on each time domain symbol is the $n_{RS,CS}^{(3)}(n_s)$.

The present invention is typically applied to using the location relationship 1 or 2 or 3 to determine the physical uplink control channel resources, and the method includes: the terminal determining the frequency domain resources, namely the location of the physical uplink control channel format 3 in the total physical uplink control channel areas, used when the physical uplink control channel format 3 is sent according to the parameters configured by a base station, and the location is determined according to one of following 3 location relationships:

location relationship 1: from a bandwidth edge to a bandwidth center, the total physical uplink control channel areas comprising in turn a physical uplink control channel format 3 area, a physical uplink control channel format 2/2a/2b area, a hybrid resource block and a physical uplink control channel format 1/1a/1b area;

location relationship 2: from a bandwidth edge to a bandwidth center, the total physical uplink control channel areas comprising in turn a physical uplink control channel format 2/2a/2b area, a physical uplink control channel format 3 area, a hybrid resource block and a physical uplink control channel format 1/1a/1b area;

location relationship 3: from a bandwidth edge to a bandwidth center, the total physical uplink control channel areas comprising in turn a physical uplink control channel format 2/2a/2b area, a hybrid resource block, a physical uplink control channel format 3 area and a physical uplink control channel format 1/1a/1b area.

The base station only configures one of the $N_{RB}^{(3)}$ and $N_{PUCCH}^{(3)}$, or configures neither of the $N_{RB}^{(3)}$ and $N_{PUCCH}^{(3)}$.

The terminal determines a virtual frequency domain resource block index m of the physical uplink control channel format 3; when the base station configures $N_{RB}^{(3)}$, $m=N_{RB}^{(2)}-N_{RB}^{(3)}+\lfloor n_{PUCCH}^{(3)}/N_{CH} \rfloor$; when the base station configures $N_{PUCCH}^{(3)}$, $m=N_{PUCCH}^{(3)}+\lfloor n_{PUCCH}^{(3)}/N_{CH} \rfloor$; and when the base station does not configure the $N_{RB}^{(3)}$ and $N_{PUCCH}^{(3)}$, $m=N_{RB}^{(2)}-1-\lfloor n_{PUCCH}^{(3)}/N_{CH} \rfloor$ or $m=\lfloor n_{PUCCH}^{(3)}/N_{CH} \rfloor$ or $$m = N_{RB}^{(2)} + \left\lceil \frac{N_{CS}^{(1)}}{8} \right\rceil + \lfloor n_{PUCCH}^{(3)}/N_{CH} \rfloor.$$

Wherein, $N_{RB}^{(2)}$ represents a total number of physical resource blocks occupied by a physical uplink control channel format 2/2a/2b and the physical uplink control channel format 3, or $N_{RB}^{(2)}$ represents a total number of physical resource blocks occupied by the physical uplink control channel format 2/2a/2b;

$n_{PUCCH}^{(3)}$ represents a channel index, used when the physical uplink control channel format 3 is sent, obtained by the terminal;

$N_{CS}^{(1)}$ represents a number of cyclic shifts used for sending a physical uplink control channel format 1/1a/1b in the hybrid resource block;

$N_{CH}$ represents a number of channels of the physical uplink control channel format 3 which can be multiplexed within one resource block;

$N_{RB}^{(3)}$ represents a number of physical resource blocks occupied by the physical uplink control channel format 3;

$N_{PUCCH}^{(3)}$ represents a start physical resource block index of the physical uplink control channel format 3 area in the frequency domain.

According to a mapping relationship between the virtual frequency domain resource block index m and a physical frequency domain resource block index, the terminal obtains a physical frequency domain resource block index $n_{PRB}^{(3)}$ practically used when the physical uplink control channel format 3 is sent, specifically, when a value of m+$n_s$ mod 2 is an integral multiple of 2, $$n_{PRB}^{(3)} = \left\lfloor \frac{m}{2} \right\rfloor,$$

and when the value of m+$n_s$ mod 2 is not an integral multiple of 2, $$n_{PRB}^{(3)} = N_{RB}^{UL} - 1 - \left\lfloor \frac{m}{2} \right\rfloor,$$

wherein, mod represents modular arithmetic, and $N_{RB}^{UL}$ represents a number of physical resource blocks contained in uplink bandwidth.

That is, $$n_{PRB}^{(3)} = \begin{cases} \left\lfloor \frac{m}{2} \right\rfloor & \text{if } (m+n_s \text{ mod2})\text{mod2} = 0 \\ N_{RB}^{UL} - 1 - \left\lfloor \frac{m}{2} \right\rfloor & \text{if } (m+n_s \text{ mod2})\text{mod2} = 1 \end{cases}.$$

The terminal determining the code domain resource used when the physical uplink control channel format 3 is sent refers to: according to the number of channels $N_{CH}$ of the physical uplink control channel format 3 which can be multiplexed within one resource block, the terminal determining a relative channel index n'($n_s$)($n_s$ mod 2=0) of the channel index $n_{PUCCH}^{(3)}$ within one resource block on the first timeslot within the subframe, it is specifically as follows: n'($n_s$)=mod($n_{PUCCH}^{(3)}$, $N_{CH}$), and $N_{CH}$ represents the number of channels of the physical uplink control channel format 3 which can be multiplexed within one resource block.

According to the n'($n_s$), the terminal determines the code domain resource of the physical uplink control channel format 3, namely a sequence index $n_{OC}^{(3)}$($n_s$) corresponding to a time domain spread sequence and a sequence index $n_{RS,CS}^{(3)}$($n_s$) corresponding to a reference signal sequence used when the physical uplink control channel format 3 is sent, a value of the $n_{OC}^{(3)}$($n_s$) is a value of the n'($n_s$), a value of the $n_{RS,CS}^{(3)}$($n_s$)) is a product of the n'($n_s$) and $\Delta_{shift}^{PUCCH}$, the $\Delta_{shift}^{PUCCH}$ represents a cyclic shift interval of a Constant Amplitude Zero shift Auto-Correlation (CAZAC) sequence, and values of the $\Delta_{shift}^{PUCCH}$ are 1, 2 and 3.

Wherein, a value of the number of channels $N_{CH}$ of the physical uplink control channel format 3 which can be multiplexed within one resource block is related to a number of channels $N_{CH}^{OC}$ which can be multiplexed through the time domain spread sequence and a number of channels $N_{CH}^{RS}$ which can be multiplexed through the reference signal sequence; specifically, the value of the $N_{CH}$ is a minimum of the $N_{CH}^{OC}$ and the $N_{CH}^{RS}$.

The number of channels $N_{CH}^{OC}$ which can be multiplexed through the time domain spread sequence is related to a time domain spread sequence length.

The time domain spread sequence length is related to a cyclic prefix type used by the physical uplink control channel format 3, a data-reference signal structure and whether the physical uplink control channel format 3 uses a truncated structure.

The truncated structure of the physical uplink control channel format 3 refers to a structure used when the physical uplink control channel format 3 and an uplink Sounding Reference Signal (SRS) are sent simultaneously.

As for the time domain spread sequences, different sequences are used according to different sequence lengths thereof. When the time domain spread sequence length is 3, a 3-order DFT sequence is used; when the time domain spread sequence length is 4, a 4-order Walsh sequence is used; and when the time domain spread sequence length is 5, a 5-order DFT sequence or CAZAC sequence is used.

The number of channels $N_{CH}^{RS}$ which can be multiplexed through the reference signal sequence is related to a cyclic shift interval $\Delta_{shift}^{PUCCH}$ used by the reference signal sequence configured by the base station currently; specifically, $N_{CH}^{RS} = \lfloor 12/\Delta_{shift}^{PUCCH} \rfloor$; or, when the reference signal sequence uses the time domain spreading, the number of channels $N_{CH}^{RS}$ which can be multiplexed through the reference signal sequence is related to a cyclic shift interval $\Delta_{shift}^{PUCCH}$ used by the reference signal sequence configured by the base station currently and a time domain spread sequence length of a reference signal; specifically, $N_{CH}^{RS} = \lfloor 12/\Delta_{shift}^{PUCCH} \rfloor * n_{RS,OC}^{(3)}$.

The time domain spread sequence length of the reference signal is related to the data-reference signal structure used by the physical uplink control channel format 3, and specifically, the time domain spread sequence length of the reference signal is equal to a number $n_{RS,OC}^{(3)}$ of symbols of the reference signal in the data-reference signal structure used by the physical uplink control channel format 3.

When the physical uplink control channel format 3 uses code resource hopping based on timeslots, a relative channel index $n'(n_s)$ ($n_s$ mod 2=1) on a second timeslot of the subframe has a mapping relationship with the relative channel index $n'(n_s)$ ($n_s$ mod 2=0) on the first timeslot; and when the physical uplink control channel format 3 does not use the code resource hopping based on timeslots, the relative channel index $n'(n_s)$ ($n_s$ mod 2=1) on the second timeslot of the subframe is equal to the relative channel index $n'(n_s)$ ($n_s$ mod 2=0) on the first timeslot.

When the reference signal sequence uses cyclic shift hopping based on symbols, a sequence index used by the reference signal sequence on each time domain symbol has a mapping relationship with $n_{RS,CS}^{(3)}(n_s)$ and with a cyclic shift hopping pattern $n_s(n_s,l)$ based on symbols, wherein l is an index of the reference signal corresponding to the time domain symbol within one timeslot; and when the reference signal sequence does not use the cyclic shift hopping based on symbols, the sequence index used by the reference signal sequence on each time domain symbol is the $n_{RS,CS}^{(3)}(n_s)$.

The present invention will be described in detail in combination with the accompanying drawings below.

Example 1

The example 1 is applied to a situation of the location relationship 1, resource blocks of a physical uplink control channel format 3 are placed in succession, and a valid channel index $n_{PUCCH}^{(3)}$ of the physical uplink control channel format 3 starts from 0.

Figure 6:
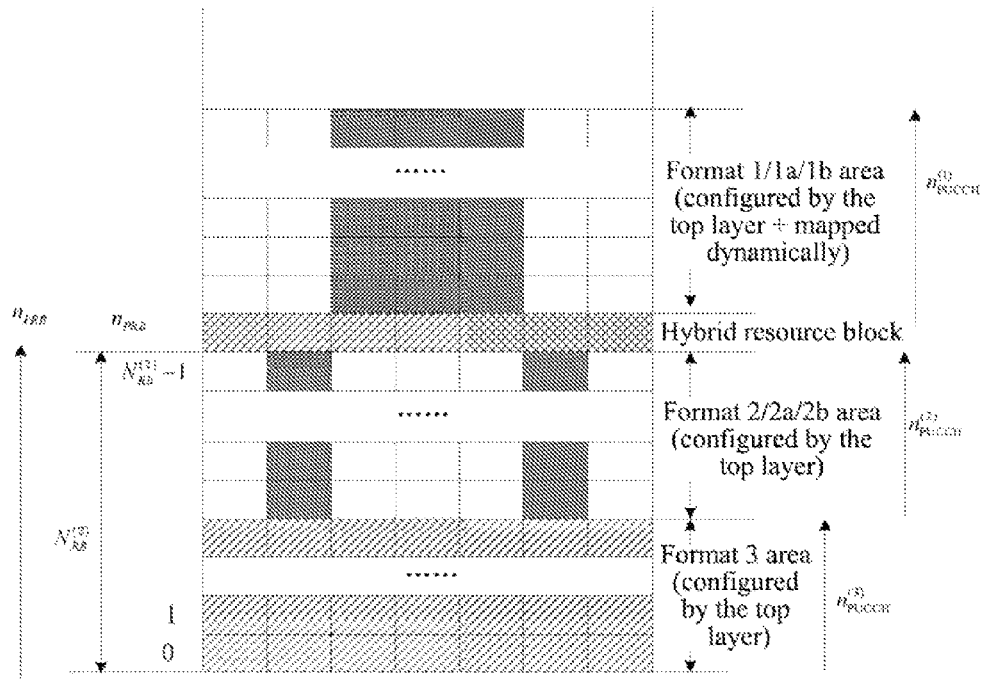
FIG. 6 is a schematic diagram of a location relationship of the physical uplink control channel format 3 in the physical uplink control channel areas according to the example 1.

As shown in FIG. 6, a location of the physical uplink control channel format 3 in total physical uplink control channel areas can be of the above location relationship 1: from a bandwidth edge to a bandwidth center, being in turn a physical uplink control channel format 3 area, a physical uplink control channel format 2/2a/2b area, a hybrid resource block (if configured) and a physical uplink control channel format 1/1a/1b area.

Meanwhile, it is assumed that the physical uplink control channel format 3 uses a frame structure with a normal cyclic prefix, a data-reference signal structure is a structure in which one timeslot contains 2 references signals, and the references signals do not use the time domain spreading, and a truncated structure is not used at the same time.

In this location relationship, a base station configures the following relevant parameters for a terminal to perform a channelization of the physical uplink control channel format 3.

$\Delta_{shift}^{PUCCH}$: it represents a cyclic shift interval of a CG-CAZAC sequence, and its values are 1, 2 and 3, assumed that $\Delta_{shift}^{PUCCH}=2$ here.

$n_{PUCCH}^{(3)}$: it represents a channel index, used when the physical uplink control channel format 3 is sent, obtained by the terminal, assumed that $n_{PUCCH}^{(3)}=4$ here.

In the assumed structure, a time domain spread sequence length of the physical uplink control channel format 3 is 5, thus the number of channels which can be multiplexed through a time domain spread sequence, $N_{CH}^{OC}=5$, and the number of channels which can be multiplexed through a reference signal sequence, $N_{CH}^{RS}=\lfloor 12/\Delta_{shift}^{PUCCH} \rfloor=6$; thus the number of channels of the physical uplink control channel format 3 which can be multiplexed within one resource block is:

$$N_{CH}=\min\{N_{CH}^{OC}, N_{CH}^{RS}\}\min\{5,6\}=5.$$

According to the channel index $n_{PUCCH}^{(3)}$, the location of the physical uplink control channel format 3 in the total physical uplink control channel areas shown in FIG. 6, and the number of channels $N_{CH}$ of the physical uplink control channel format 3 which can be multiplexed within one resource block, the terminal determines a virtual frequency domain resource block index m of the physical uplink control channel format 3 by the following way:

$$m = \lfloor n_{PUCCH}^{(3)}/N_{CH} \rfloor \quad (1\text{-}1),$$

the values are put into items to obtain $m=\lfloor 4/5 \rfloor=0$.

Then, according to a mapping relationship between the virtual frequency domain resource block index and a physical frequency domain resource block index as shown below, a physical frequency domain resource block index $n_{PRB}^{(3)}$ practically used when the physical uplink control channel format 3 is sent is obtained:

$$n_{PRB}^{(3)} = \begin{cases} \lfloor \frac{m}{2} \rfloor & \text{if } (m+n_s \text{ mod}2)\text{mod}2 = 0 \\ N_{RB}^{UL}-1-\lfloor \frac{m}{2} \rfloor & \text{if } (m+n_s \text{ mod}2)\text{mod}2 = 1 \end{cases} \quad (1\text{-}2).$$

According to the channel index $n_{PUCCH}^{(3)}$ and the number of channels $N_{CH}$ of the physical uplink control channel format 3 which can be multiplexed within one resource block, the terminal determines a relative channel index $n'(n_s)(n_s \text{ mod } 2=0)$ of the channel index $n_{PUCCH}^{(3)}$ in one resource block on the first timeslot within a subframe in the following way:

$$n'(n_s) = \text{mod}(n_{PUCCH}^{(3)}, N_{CH}) \quad (1\text{-}3),$$

the values are put into items to obtain $n'(n_s)=\text{mod}(4, 5)=4$.

According to the $n'(n_s)$, the terminal determines the code domain resource of the physical uplink control channel format 3 by the following way, that is, a sequence index $n_{OC}^{(3)}(n_s)$ corresponding to the time domain spread sequence and a sequence index $n_{RS,CS}^{(3)}(n_s)$ corresponding to the reference signal sequence used when the physical uplink control channel format 3 is sent are:

$$\begin{cases} n_{OC}^{(3)}(n_s) = n'(n_s) \\ n_{RS,CS}^{(3)}(n_s) = n'(n_s) * \Delta_{shift}^{PUCCH} \end{cases} \quad (1\text{-}4),$$

the values are put into items to obtain $$\begin{cases} n_{OC}^{(3)}(n_s) = n'(n_s) = 4 \\ n_{RS,CS}^{(3)}(n_s) = n'(n_s) * \Delta_{shift}^{PUCCH} = 8 \end{cases}.$$

Through the above process, the terminal determines the frequency domain resource and the initial code domain resource used when sending the physical uplink control channel format 3.

Furthermore, when the physical uplink control channel format 3 uses code resource hopping based on timeslots, a relative channel index $n'(n_s)(n_s \bmod 2=1)$ on the second timeslot of the subframe has a mapping relationship with the relative channel index $n'(n_s)(n_s \bmod 2=0)$ on the first timeslot, with the mapping relationship, the terminal obtains the relative index $n'(n_s)(n_s \bmod 2=1)$ on the second timeslot of the subframe, and then according to the formulas (1-4), it can obtain a time domain spread sequence used on the second timeslot and an initial value of cyclic shift amount used by a reference signal.

When the code resource hopping based on timeslots uses a way of mirroring mapping, the relative index on the second timeslot is: $n'(n_s)=N_{CH}-1-n'(n_s-1)$, $\bmod(n_s, 2)=1$; that is, if the terminal uses a channel resource with a relative index of 0 on the first timeslot, the terminal will use a channel resource with a relative index of 5 on the second timeslot (assumed that $N_{CH}=5$ here).

Or, when the code resource hopping based on timeslots turns into a random rearrangement of channel resource indexes, that is, a resource index arrangement used by the second timeslot is an arrangement after all values in a resource index arrangement used in the first timeslot are rearranged randomly, and when a certain terminal uses the Nth index value in the channel resource arrangement corresponding to the first timeslot on the first timeslot, this terminal also uses the Nth index value in the channel resource arrangement corresponding to the second timeslot on the second timeslot. For example, it is assumed that the channel resource index arrangement used by the first timeslot is {0, 1, 2, 3, 4}, and the arrangement of resource indexes used by the second timeslot is {4, 2, 0, 3, 1} after they are rearranged randomly, thus, if it is assumed that a certain terminal uses a channel resource with a channel resource index of 2 on the first timeslot, the terminal will use a channel resource with an index of 0 on the second timeslot.

The main object of using the code resource hopping based on timeslots is to implement interference randomization between terminals within a cell, that is, due to the undesirability of channels, code resources used by individual terminals are not orthogonal completely any more, if the code interference is comparatively strong between two terminals during the first timeslot, after going through the code resource hopping based on timeslots, the code interference will become comparatively weak during the second timeslot. Therefore, it is guaranteed that interferences from other terminals on each terminal multiplexed within the same physical resource block in one subframe are relatively uniform, thereby implementing the interference randomization between the terminals.

Furthermore, when the reference signal sequence uses cyclic shift hopping based on symbols, a sequence index $n_{RS,CS}^{(3)}(n_s, l)$ used by the reference signal sequence on each time domain symbol has a mapping relationship with $n_{RS,CS}^{(3)}(n_s)$ and has a mapping relationship with a cyclic shift hopping pattern based on symbols $n_{cs}(n_s,l)$, wherein l is an index of the reference signal corresponding to the time domain symbol within one timeslot, and after using the mapping relationship, the sequence index $n_{RS,CS}^{(3)}(n_s,l)$ intended to be used by the reference signal sequence on each time domain symbol can be obtained.

The cyclic shift hopping pattern based on symbols $n_{cs}(n_s,l)$ is exclusive to the cell, and it can be obtained in a random way, for example, $n_{cs}(n_s,l)$ is determined by the following way:

$n_{cs}^{cell}(n_s,l)=\Sigma_{i=0}^{7} c(8N_{symb}^{UL} \cdot n_s + 8l+i) \cdot 2^i$, wherein, c(i) is a sequence obtained according to a scrambler, and an initial state of the scrambler is related to a cell identifier. $N_{symb}^{UL}$ is the number of symbols contained in an uplink timeslot.

Example 2

The example 2 is applied to a situation of the location relationship 2, and resource blocks of a physical uplink control channel format 3 are placed in succession.

Figures 1, 7:
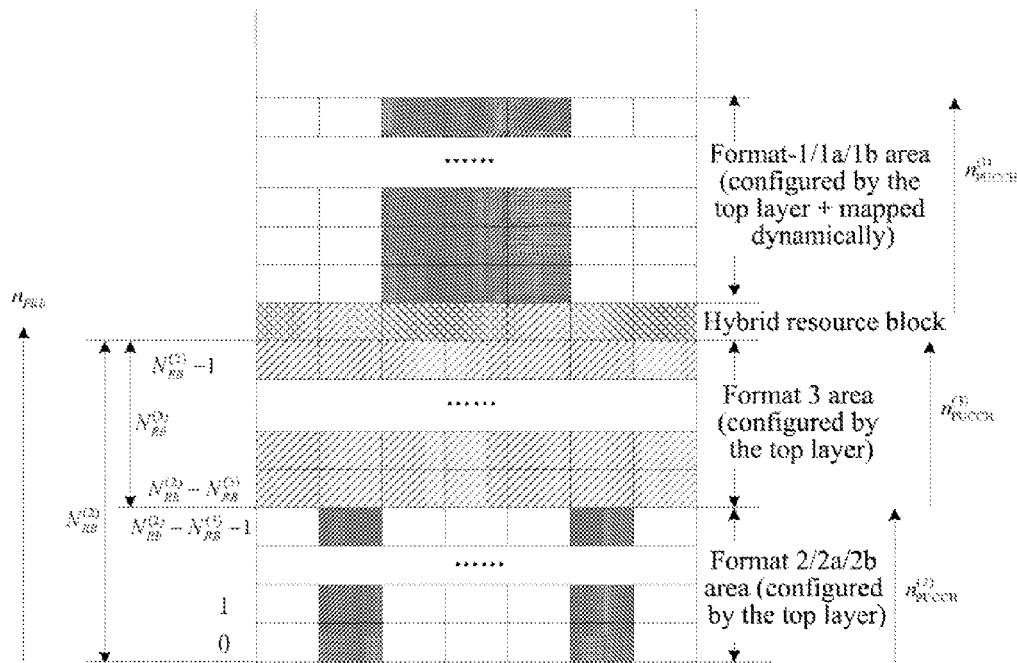
Figures 2, 7:
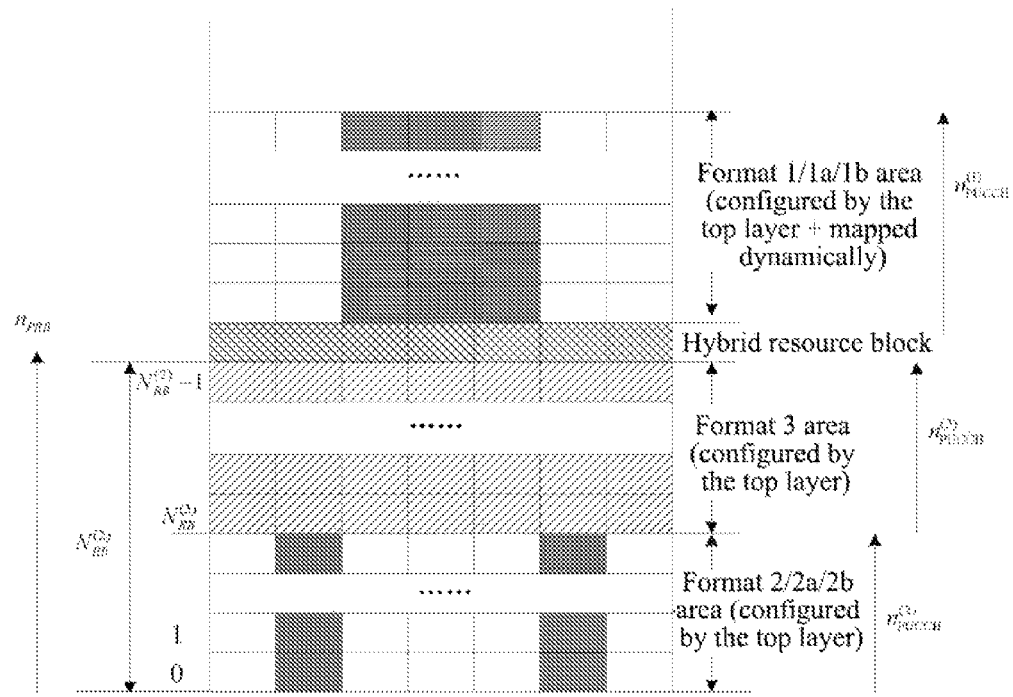
Figures 3, 7:
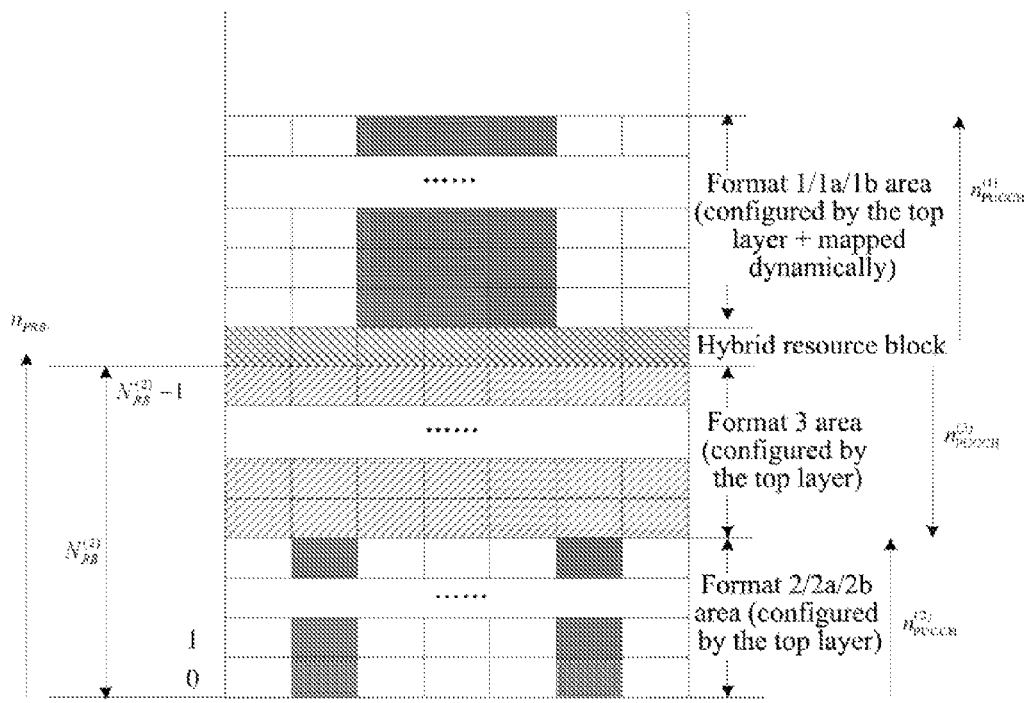
Figures 4, 7:
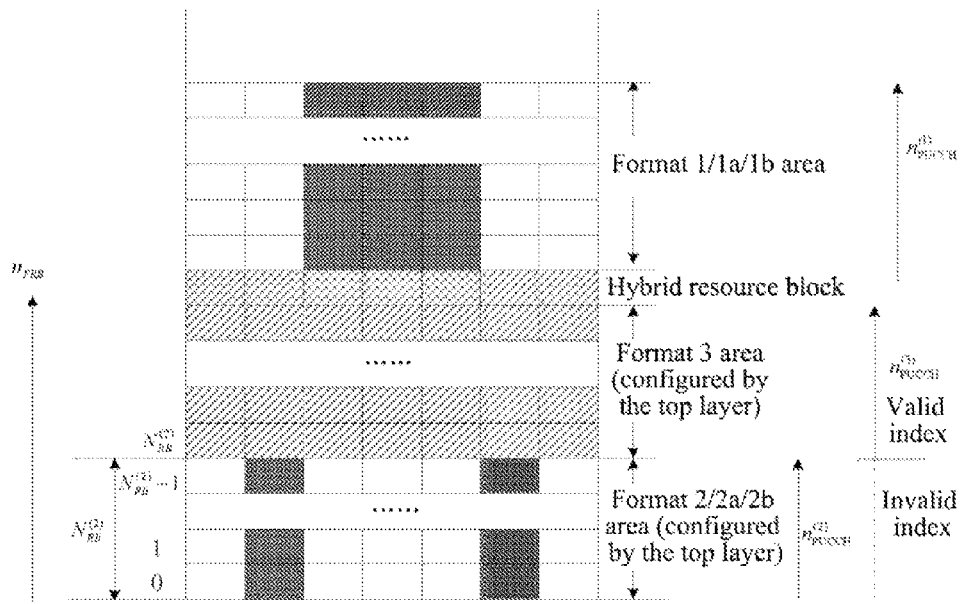

As shown in FIG. 7, a location of the physical uplink control channel format 3 in total physical uplink control channel areas can be of the above location relationship 2: from the bandwidth edge to the bandwidth center, being in turn a physical uplink control channel format 2/2a/2b area, a physical uplink control channel format 3 area, a hybrid resource block (if configured) and a physical uplink control channel format 1/1a/1b area.

Meanwhile, it is assumed that the physical uplink control channel format 3 uses a frame structure with a normal cyclic prefix, a data-reference signal structure is a structure in which one timeslot contains 2 references signals, and the references signals do not use the time domain spreading, and a truncated structure is not used at the same time.

Example 2-1

In this embodiment, resource blocks of a Physical Uplink Control Channel (PUCCH) format 3 are placed in succession, $N_{RB}^{(3)}$ is configured and it represents the number of Physical Resource Blocks (PRB) occupied by the PUCCH format 3, with a small index $n_{PUCCH}^{(3)}$, it is mapped to an RB on the bandwidth edge, and a valid channel index $n_{PUCCH}^{(3)}$ starts from 0.

As shown in FIG. 7-1, in this location relationship, a base station configures the following relevant parameters for a terminal to perform the channelization of the physical uplink control channel format 3.

$N_{RB}^{(2)}$: it represents the total number of physical resource blocks occupied by a physical uplink control channel format 2/2a/2b and the physical uplink control channel format 3, and it is assumed that $N_{RB}^{(2)}=4$ here.

$\Delta_{shift}^{PUCCH}$: it represents a cyclic shift interval of a CG-CAZAC sequence, its values are 1, 2 and 3, and it is assumed that $\Delta_{shift}^{PUCCH}=2$ here.

$n_{PUCCH}^{(3)}$: it represents a channel index, used when the physical uplink control channel format 3 is sent, obtained by the terminal, and it is assumed that $n_{PUCCH}^{(3)}=4$ here.

$N_{RB}^{(3)}$: it represents the number of physical resource blocks occupied by the physical uplink control channel format 3, and it is assumed that $N_{RB}^{(3)}=2$ here.

In the assumed structure, a time domain spread sequence length of the physical uplink control channel format 3 is 5, thus the number of channels which can be multiplexed through a time domain spread sequence $N_{CH}^{OC}=5$, and the number of channels which can be multiplexed through a reference signal sequence $N_{CH}^{RS}=\lfloor 12/\Delta_{shift}^{PUCCH} \rfloor=6$; thus the number of channels of the physical uplink control channel format 3 which can be multiplexed within one resource block is:

$$N_{CH}=\min\{N_{CH}^{OC},N_{CH}^{RS}\}\min\{5,6\}=5.$$

According to the channel index $n_{PUCCH}^{(3)}$, the location of the physical uplink control channel format 3 in the total physical uplink control channel areas shown in FIG. 7-1 and the number of channels $N_{CH}$ of the physical uplink control channel format 3 which can be multiplexed within one resource block, the terminal determines a virtual frequency domain resource block index m of the physical uplink control channel format 3 by the following way:

$$m=N_{RB}^{(2)}-N_{RB}^{(3)}+\lfloor n_{PUCCH}^{(3)}/N_{CH}\rfloor \quad (2\text{-}1),$$

the values are put into items to obtain $m=4-2+\lfloor 4/5 \rfloor=2$.

Then, according to a mapping relationship between the virtual frequency domain resource block index and a physical frequency domain resource block index as shown below, a physical frequency domain resource block index $n_{PRB}^{(3)}$ practically used when the physical uplink control channel format 3 is sent is obtained:

$$n_{PRB}^{(3)} = \begin{cases} \lfloor \frac{m}{2} \rfloor & \text{if } (m+n_s \bmod 2)\bmod 2 = 0 \\ N_{RB}^{UL}-1-\lfloor \frac{m}{2} \rfloor & \text{if } (m+n_s \bmod 2)\bmod 2 = 1 \end{cases} \quad (2\text{-}2)$$

According to the channel index $n_{PUCCH}^{(3)}$ and the number of channels $N_{CH}$ of the physical uplink control channel format 3 which can be multiplexed within one resource block, the terminal determines a relative channel index $n'(n_s)(n_s \bmod 2=0)$ of the channel index $n_{PUCCH}^{(3)}$ within one resource block on the first timeslot within a subframe by the following way:

$$n'(n_s)=\bmod(n_{PUCCH}^{(3)},N_{CH}) \quad (2\text{-}3),$$

the values are put into items to obtain $n'(n_s)=\bmod(4, 5)=4$.

According to the $n'(n_s)$, the terminal determines a code domain resource of the physical uplink control channel format 3 by the following way, that is, a sequence index $n_{OC}^{(3)}(n_s)$ corresponding to the time domain spread sequence and a sequence index $n_{RS,CS}^{(3)}(n_s)$ corresponding to the reference signal sequence used when the physical uplink control channel format 3 is sent are:

$$\begin{cases} n_{OC}^{(3)}(n_s) = n'(n_s) \\ n_{RS,CS}^{(3)}(n_s) = n'(n_s) * \Delta_{shift}^{PUCCH} \end{cases} \quad (2\text{-}4)$$

the values are put into items to obtain $$\begin{cases} n_{OC}^{(3)}(n_s) = n'(n_s) = 4 \\ n_{RS,CS}^{(3)}(n_s) = n'(n_s) * \Delta_{shift}^{PUCCH} = 8 \end{cases}.$$

Through the above process, the terminal determines a frequency domain resource and an initial code domain resource used when sending the physical uplink control channel format 3.

Furthermore, when the physical uplink control channel format 3 uses code resource hopping based on timeslots, a relative channel index $n'(n_s)$ ($n_s \bmod 2=1$) on the second timeslot of the subframe has a mapping relationship with the relative channel index $n'(n_s)$ ($n_s \bmod 2=0$) on the first timeslot, with the mapping relationship, the terminal obtains the relative index $n'(n_s)$ ($n_s \bmod 2=1$) on the second timeslot of the subframe, and then according to the formulas (2-4), it can obtain a time domain spread sequence used on the second timeslot and an initial value of cyclic shift amount used by a reference signal.

Furthermore, when the reference signal sequence uses cyclic shift hopping based on symbols, a sequence index $n_{RS,CS}^{(3)}(n_s,l)$ used by the reference signal sequence on each time domain symbol has a mapping relationship with $n_{RS,CS}^{(3)}(n_s)$ and with a cyclic shift hopping pattern based on symbols $n_{cs}(n_s,l)$, wherein l is an index of the reference signal corresponding to the time domain symbol within one timeslot, and after using the mapping relationship, the sequence index $n_{RS,CS}^{(3)}(n_s,l)$ used by the reference signal sequence on each time domain symbol can be obtained.

Example 2-2

In this embodiment, resource blocks of a Physical Uplink Control Channel (PUCCH) format 3 are placed in succession, $N_{PUCCH}^{(3)}$ is configured and it represents a start RB index of the PUCCH format 3, with a small index $n_{PUCCH}^{(3)}$, it is mapped to an RB on the bandwidth edge, and a valid channel index $n_{PUCCH}^{(3)}$ starts from 0.

Figure 2:
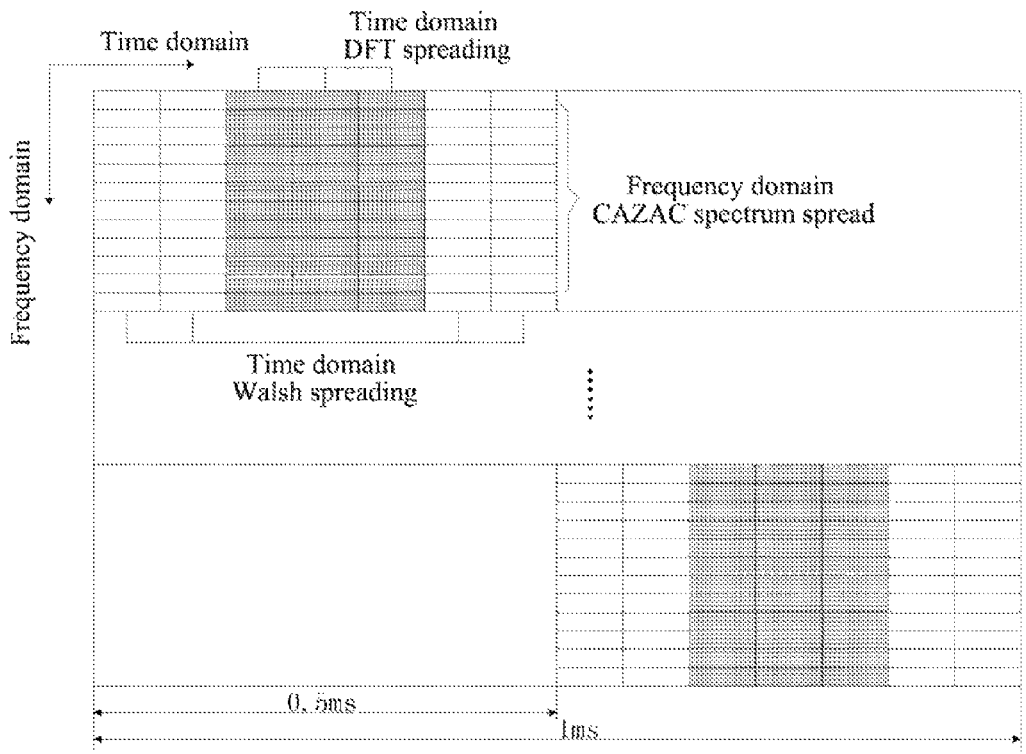
FIG. 2 is a schematic diagram of a structure of the physical uplink control channel format 1.

As shown in FIG. 7-2, in this location relationship, a base station configures the following relevant parameters for a terminal to perform the channelization of the physical uplink control channel format 3.

$\Delta_{shift}^{PUCCH}$: it represents a cyclic shift interval of a CG-CAZAC sequence, its values are 1, 2 and 3, and it is assumed that $\Delta_{shift}^{PUCCH}=2$ here.

$n_{PUCCH}^{(3)}$: it represents a channel index, used when the physical uplink control channel format 3 is sent, obtained by the terminal, and it is assumed that $n_{PUCCH}^{(3)}=4$ here.

$N_{PUCCH}^{(3)}$: it represents a start physical resource block index of the physical uplink control channel format 3 area on a frequency domain.

In the structure, by a way identical with that in the example 2-1, $N_{CH}=5$ is obtained.

According to the channel index $n_{PUCCH}^{(3)}$, the location of the physical uplink control channel format 3 in the total physical uplink control channel areas shown in FIG. 7-2 and the number of channels $N_{CH}$ of the physical uplink control channel format 3 which can be multiplexed within one resource block, the terminal determines a virtual frequency domain resource block index m of the physical uplink control channel format 3 by the following way:

$$m=N_{PUCCH}^{(3)}+\lfloor n_{PUCCH}^{(3)}/N_{CH}\rfloor \quad (2\text{-}5),$$

the values are put into items to obtain $m=2+\lfloor 4/5 \rfloor=2$;

a calculation method for $m \rightarrow n_{PRB}$ is identical with that in the example 2-1;

methods for calculating $n'(n_s)(n_s \bmod 2=0)$, $n_{OC}^{(3)}(n_s)$ and $n_{RS,CS}^{(3)}(n_s)$ are identical with those in the example 2-1, which will not be repeated here.

Example 2-3

In this embodiment, resource blocks of a physical uplink control channel format 3 are placed in succession, $N_{RB}^{(3)}$ or $N_{PUCCH}^{(3)}$ is not configured, with a small index $n_{PUCCH}^{(3)}$, it is mapped to an RB close to the bandwidth center, that is, starting from $N_{RB}^{(2)}$, it is mapped from inside to outside, and a valid channel index $n_{PUCCH}^{(3)}$ starts from 0.

Figure 3:
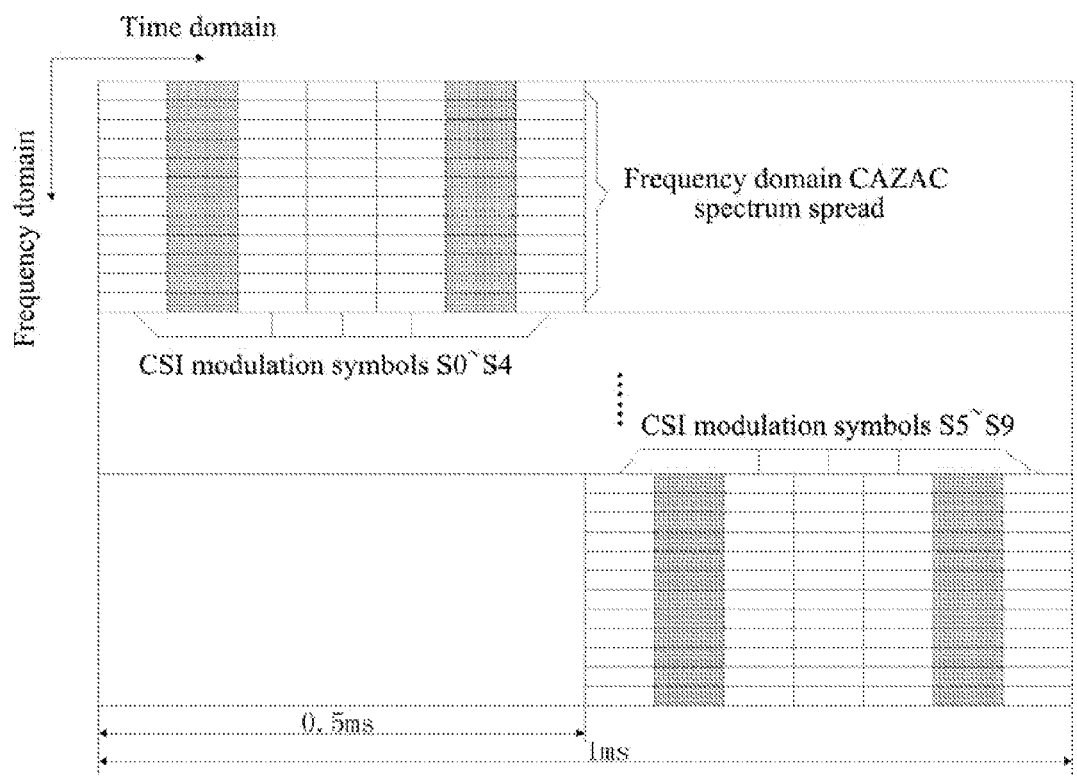
FIG. 3 is a schematic diagram of a structure of the physical uplink control channel format 2.

As shown in FIG. 7-3, in this location relationship, a base station configures the following relevant parameters for a terminal to perform the channelization of the physical uplink control channel format 3.

$N_{RB}^{(2)}$: it represents the total number of physical resource blocks occupied by a physical uplink control channel format 2/2a/2b and the physical uplink control channel format 3, and it is assumed that $N_{RB}^{(2)}=4$ here.

$\Delta_{shift}^{PUCCH}$: it represents a cyclic shift interval of a CG-CAZAC sequence, its values are 1, 2 and 3, and it is assumed that $\Delta_{shift}^{PUCCH}=2$ here.

$n_{PUCCH}^{(3)}$: it represents a channel index, used when the physical uplink control channel format 3 is sent, obtained by the terminal, and it is assumed that $n_{PUCCH}^{(3)}=4$ here.

By a way identical with that in the example 2-1, $N_{CH}=5$ is obtained.

According to the channel index $n_{PUCCH}^{(3)}$, the location of the physical uplink control channel format 3 in the total physical uplink control channel areas shown in FIG. 7-3 and the number of channels $N_{CH}$ of the physical uplink control channel format 3 which can be multiplexed within one resource block, the terminal determines a virtual frequency domain resource block index m of the physical uplink control channel format 3 by the following way:

$$m = N_{RB}^{(2)} - 1 - \lfloor n_{PUCCH}^{(3)}/N_{CH} \rfloor \quad (2\text{-}6),$$

the values are put into items to obtain $m=4-1+\lfloor 4/5 \rfloor=3$;

a calculation method for $m \to n_{PRB}$ is identical with that in the example 2-1;

methods for calculating $n'(n_s)(n_s \bmod 2=0)$, $n_{OC}^{(3)}(n_s)$ and $n_{RS,CS}^{(3)}(n_s)$ are identical with those in the example 2-1, which will not be repeated here.

Example 2-4

In this embodiment, resource blocks of a physical uplink control channel format 3 are placed in succession, $N_{RB}^{(3)}$ or $N_{PUCCH}^{(3)}$ is not configured, with a small index $n_{PUCCH}^{(3)}$, it is mapped to an RB on the bandwidth edge, and the existence of a physical uplink control channel format 2 is considered, and a valid channel index $n_{PUCCH}^{(3)}$ does not start from 0.

Figure 4:
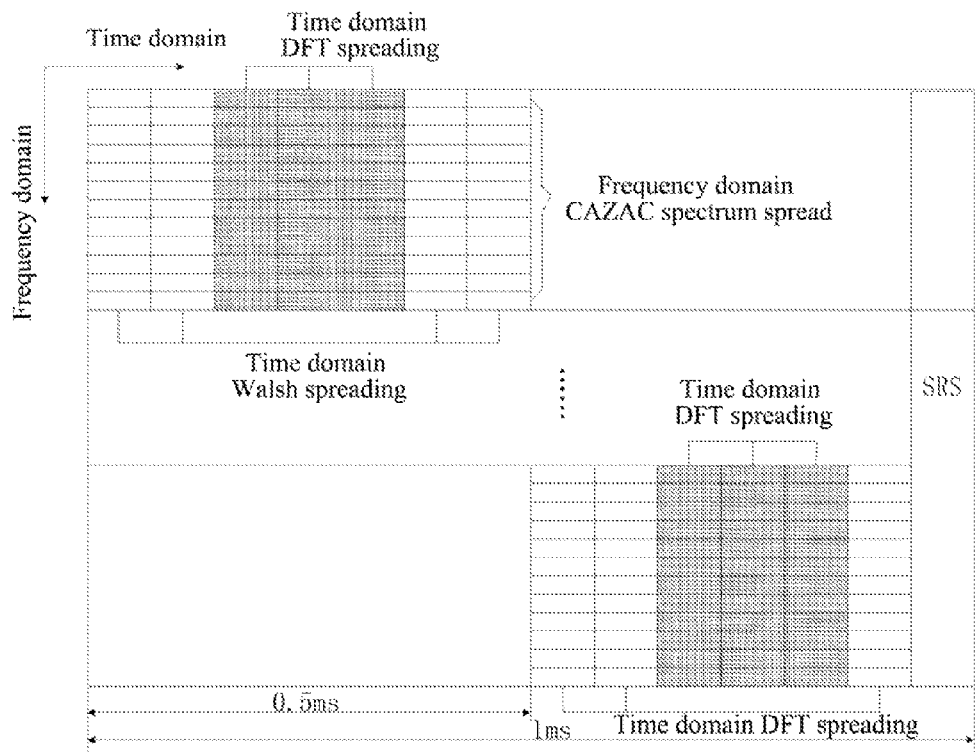
FIG. 4 is a schematic diagram of a truncated structure of the physical uplink control channel format 1.

As shown in FIG. 7-4, in this location relationship, a base station configures the following relevant parameters for a terminal to perform the channelization of the physical uplink control channel format 3.

$\Delta_{shift}^{PUCCH}$: it represents a cyclic shift interval of a CG-CAZAC sequence, its values are 1, 2 and 3, and it is assumed that $\Delta_{shift}^{PUCCH}=2$ here.

$n_{PUCCH}^{(3)}$: it represents a channel index, used when the physical uplink control channel format 3 is sent, obtained by the terminal, and in consideration of the existence of the physical uplink control channel format 2, it is assumed that $n_{PUCCH}^{(3)}=14$ here.

By a way identical with that in the example 2-1, $N_{CH}=5$ is obtained.

According to the channel index $n_{PUCCH}^{(3)}$, the location of the physical uplink control channel format 3 in the total physical uplink control channel areas shown in FIG. 7-4 and the number of channels $N_{CH}$ of the physical uplink control channel format 3 which can be multiplexed within one resource block, the terminal determines a virtual frequency domain resource block index m of the physical uplink control channel format 3 by the following way:

$$m = \lfloor n_{PUCCH}^{(3)}/N_{CH} \rfloor \quad (2\text{-}7),$$

the values are put into items to obtain $m=\lfloor 14/5 \rfloor=2$;

a calculation method for $m \to n_{PRB}$ is identical with that in the example 2-1;

methods for calculating $n'(n_s)(n_s \bmod 2=0)$, $n_{OC}^{(3)}(n_s)$ and $n_{RS,CS}^{(3)}(n_s)$ are identical with those in the example 2-1, which will not be repeated here.

It can be seen from the examples 2-1 to 2-4 that, when different parameters are configured or different implications are given to the same parameter, in the same location relationship, methods for determining frequency domain locations of the physical uplink control channel format 3 are different.

Example 3

In the example, a mixed area of physical uplink control channel format 2/2a/2b area and physical uplink control channel format 3 area is included, and resource blocks for format 2/2a/2b and format 3 appear alternately in this area.

Figure 8:
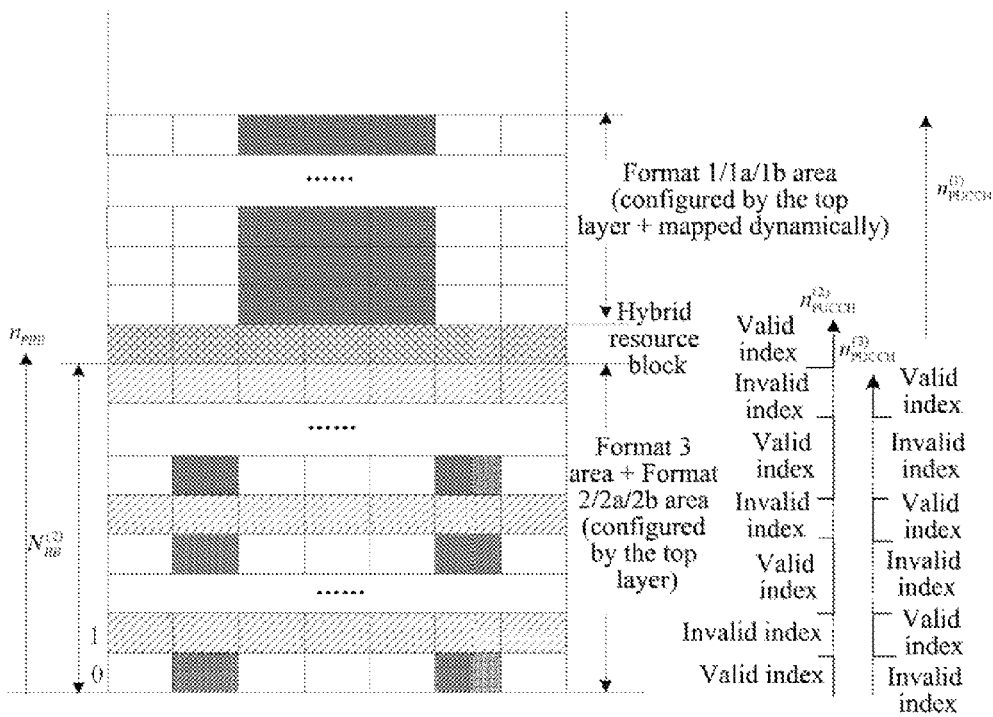
FIG. 8 is a schematic diagram of another location relationship of the physical uplink control channel format 3 in the physical uplink control channel areas according to the example 3.

As shown in FIG. 8, a location of the physical uplink control channel format 3 in total physical uplink control channel areas can be one variant example of the above location relationships 1 and 2: from the bandwidth edge to the bandwidth center, being in turn a mixed area of physical uplink control channel format 2/2a/2b area and physical uplink control channel format 3 area, a hybrid resource block (if configured) and a physical uplink control channel format 1/1a/1b area.

Meanwhile, it is assumed that the physical uplink control channel format 3 uses a frame structure with a normal cyclic prefix, a data-reference signal structure is a structure in which one timeslot contains 2 references signals, and the references signals do not use time domain spreading, and a truncated structure is not used at the same time.

In this location relationship, a base station configures the following relevant parameters for a terminal to perform the channelization of the physical uplink control channel format 3.

$N_{RB}^{(2)}$: it represents the total number of physical resource blocks occupied by a physical uplink control channel format 2/2a/2b and the physical uplink control channel format 3, and it is assumed that $N_{RB}^{(2)}=4$ here.

$\Delta_{shift}^{PUCCH}$: it represents a cyclic shift interval of a CG-CAZAC sequence, its values are 1, 2 and 3, and it is assumed that $\Delta_{shift}^{PUCCH}=2$ here.

$n_{PUCCH}^{(3)}$: it represents a channel index, used when the physical uplink control channel format 3 is sent, obtained by the terminal, and in consideration of the existence of the physical uplink control channel format 2, it is assumed that $n_{PUCCH}^{(3)}=8$ here.

In the assumed structure, a time domain spread sequence length of the physical uplink control channel format 3 is 5, thus the number of channels which can be multiplexed through a time domain spread sequence $N_{CH}^{OC}=5$, and the number of channels which can be multiplexed through a reference signal sequence $N_{CH}^{RS}=\lfloor 12/\Delta_{shift}^{PUCCH} \rfloor=6$; thus the number of channels of the physical uplink control channel format 3 which can be multiplexed within one resource block is:

$$N_{CH}=\min\{N_{CH}^{OC}, N_{CH}^{RS}\}\min\{5,6\}=5.$$

According to the channel index $n_{PUCCH}^{(3)}$, the location of the physical uplink control channel format 3 in the total physical uplink control channel areas shown in FIG. 8 and the number of channels $N_{CH}$ of the physical uplink control channel format 3 which can be multiplexed within one resource block, the terminal determines a virtual frequency domain resource block index m of the physical uplink control channel format 3 by the following way:

$$m = \lfloor n_{PUCCH}^{(3)}/N_{CH} \rfloor \quad (3\text{-}1),$$

the values are put into items to obtain $m=\lfloor 8/5 \rfloor=1$.

Then, according to a mapping relationship between the virtual frequency domain resource block index and a physical frequency domain resource block index as shown below, a physical frequency domain resource block index $n_{PRB}^{(3)}$ practically used when the physical uplink control channel format 3 is sent is obtained:

$$n_{PRB}^{(3)} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1 \end{cases} \quad (3\text{-}2)$$

According to the channel index $n_{PUCCH}^{(3)}$ and the number of channels $N_{CH}$ of the physical uplink control channel format 3 which can be multiplexed within one resource block, the terminal determines a relative channel index $n'(n_s)(n_s \bmod 2=0)$ of the channel index within one resource block on the first timeslot within a subframe by the following way:

$$n'(n_s) = \bmod(n_{PUCCH}^{(3)}, N_{CH}) \quad (3\text{-}3),$$

the values are put into items to obtain $n'(n_s) = \bmod(8, 5) = 3$.

According to the $n'(n_s)$, the terminal determines code a domain resource of the physical uplink control channel format 3 by the following way, that is, a sequence index $n_{OC}^{(3)}(n_s)$ corresponding to the time domain spread sequence and a sequence index $n_{RS,CS}^{(3)}(n_s)$ corresponding to the reference signal sequence used when the physical uplink control channel format 3 is sent are:

$$\begin{cases} n_{OC}^{(3)}(n_s) = n'(n_s) \\ n_{RS,CS}^{(3)}(n_s) = n'(n_s) * \Delta_{shift}^{PUCCH} \end{cases} \quad (3\text{-}4)$$

the values are put into items to obtain $$\begin{cases} n_{OC}^{(3)}(n_s) = n'(n_s) = 3 \\ n_{RS,CS}^{(3)}(n_s) = n'(n_s) * \Delta_{shift}^{PUCCH} = 6 \end{cases}.$$

Through the above process, the terminal determines a frequency domain resource and an initial code domain resource used when sending the physical uplink control channel format 3.

Furthermore, when the physical uplink control channel format 3 uses code resource hopping based on timeslots, a relative channel index $n'(n_s)(n_s \bmod 2=1)$ on the second timeslot of the subframe has a mapping relationship with the relative channel index $n'(n_s)(n_s \bmod 2=0)$ on the first timeslot, with the mapping relationship, the terminal obtains the relative index $n'(n_s)(n_s \bmod 2=1)$ on the second timeslot of the subframe, and then according to the formulas (3-4), it can obtain a time domain spread sequence used on the second timeslot and an initial value of cyclic shift amount used by a reference signal.

Furthermore, when the reference signal sequence uses cyclic shift hopping based on symbols, a sequence index $n_{RS,CS}^{(3)}(n_s,l)$ used by the reference signal sequence on each time domain symbol has a mapping relationship with $n_{RS,CS}^{(3)}(n_s)$ and with a cyclic shift hopping pattern based on symbols $n_{cs}(n_s,l)$, wherein l is an index of the reference signal corresponding to the time domain symbol within one timeslot, and after using the mapping relationship, the sequence index $n_{RS,CS}^{(3)}(n_s,l)$ intended to be used by the reference signal sequence on each time domain symbol can be obtained.

It can be seen from the example 3 that, in this special location relationship, channel indexes of the physical uplink control channel format 3 are not successive, and channel indexes of the physical uplink control channel format 2/2a/2b are also not successive, however, when they are all obtained by means of the higher layer configuration, as long as the base station makes reasonable configurations, it can be avoided that two control channel formats are configured simultaneously on the same resource block. However, in this location relationship, it is equivalent to a certain limitation on scheduling of the base station, but these can boil down to a scheduling implementation problem of the base station.

Figure 5:
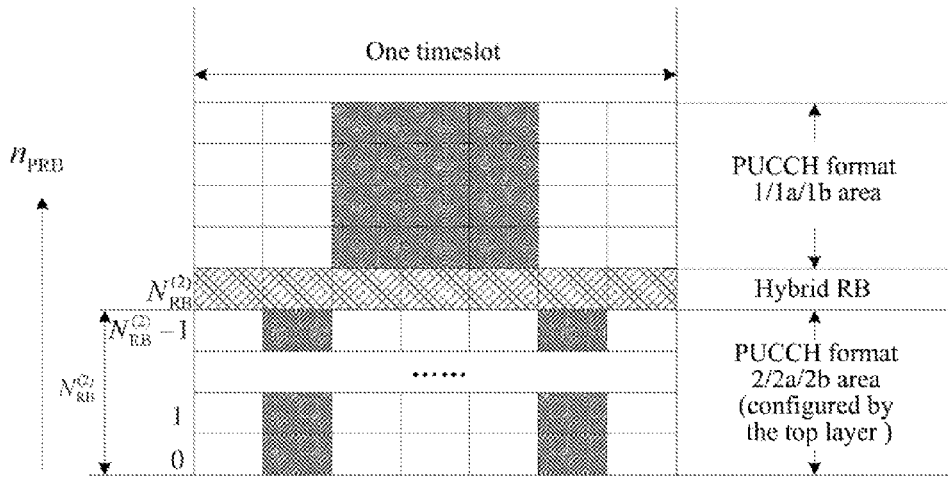
FIG. 5 is a schematic diagram of an area division of the physical uplink control channels in an LTE system.

It can be seen from the above examples 1, 2 and 3 that, in the situation of the above location relationships 1 and 2 and a special example of the location relationships 1 and 2, as long as the parameter $N_{RB}^{(2)}$ is configured as the total number of physical resource blocks occupied by the physical uplink control channel format 2/2a/2b and the physical uplink control channel format 3, thus, an index corresponding to the hybrid resource block is $N_{RB}^{(2)}$, and a physical resource block index of the physical uplink control channel format 1/1a/1b starts from $N_{RB}^{(2)}+1$ or starts from $N_{RB}^{(2)}$ (when there is no hybrid resource block). Compared with FIG. 5, it can be discovered that, after using the allocation method for uplink control channel resources disclosed in the present document, the physical uplink control channel format 1/1a/1b and the frequency domain start position corresponding to the hybrid resource block are identical with those in the regulations in the LTE, and are unrelated to whether a new configuration parameter $N_{RB}^{(3)}$ is configured. Therefore, a good compatibility exists between the present invention and the LTE, and it has a little impact on the protocol in the related art, as long as the existing parameter $N_{RB}^{(2)}$ is configured reasonably, it be can guaranteed that a channelization process of the physical uplink control channel format 1/1a/1b is identical with that of the LTE. Moreover, since the physical uplink control channel format 2/2a/2b has obtained the channel indexes thereof by means of the higher layer configuration in the LTE, as long as the base station makes reasonable configurations, a channelization process of the physical uplink control channel format 2/2a/2b is also identical with that of the LTE.

Example 4

The example 4 is applied to a situation of the location relationship 3.

Figure 9:
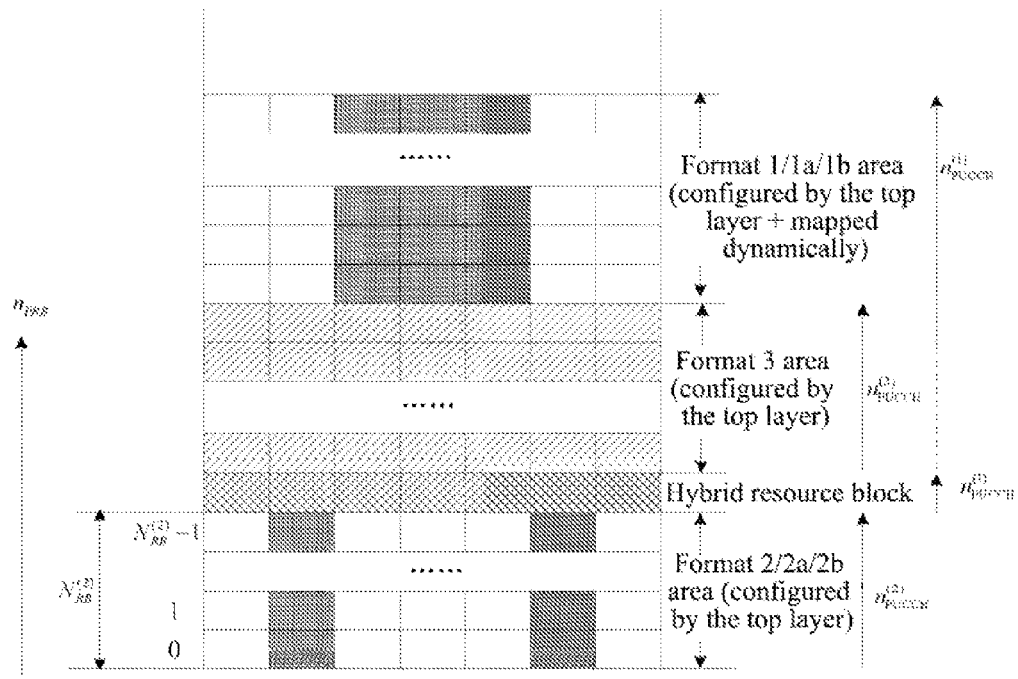
FIG. 9 is a schematic diagram of another location relationship of the physical uplink control channel format 3 in the physical uplink control channel areas according to the example 4.

As shown in FIG. 9, a location of a physical uplink control channel format 3 in total physical uplink control channel areas can be of the above location relationship 3: from the bandwidth edge to the bandwidth center, being in turn a physical uplink control channel format 2/2a/2b area, a hybrid resource block (if configured), a physical uplink control channel format 3 area and a physical uplink control channel format 1/1a/1b area.

Meanwhile, it is assumed that the physical uplink control channel format 3 uses a frame structure with a normal cyclic prefix, a data-reference signal structure is a structure in which one timeslot contains 2 references signals, and the references signals do not use the time domain spreading, and a truncated structure is not used at the same time.

In this location relationship, a base station configures the following relevant parameters for a terminal to perform the channelization of the physical uplink control channel format 3.

$N_{RB}^{(2)}$: it represents the number of physical resource blocks of a physical uplink control channel format 2/2a/2b, and it is assumed that $N_{RB}^{(2)}=4$ here.

$N_{CS}^{(1)}$: it represents the number of cyclic shifts used for sending a physical uplink control channel format 1/1a/1b in the hybrid resource block, and it is assumed that $N_{CS}^{(1)}=4$ here.

$\Delta_{shift}^{PUCCH}$: it represents a cyclic shift interval of a CG-CAZAC sequence, its values are 1, 2 and 3, and it is assumed that $\Delta_{shift}^{PUCCH}=2$ here.

$n_{PUCCH}^{(3)}$: it represents a channel index, used when the physical uplink control channel format 3 is sent, obtained by the terminal, and it is assumed that $n_{PUCCH}^{(3)}=4$ here.

In the assumed structure, a time domain spread sequence length of the physical uplink control channel format 3 is 5, thus the number of channels which can be multiplexed through a time domain spread sequence $N_{CH}^{OC}=5$, and the number of channels which can be multiplexed through a reference signal sequence $N_{CH}^{RS}=\lfloor 12/\Delta_{shift}^{PUCCH} \rfloor=6$; thus the number of channels of the physical uplink control channel format 3 which can be multiplexed within one resource block is:

$$N_{CH}=\min\{N_{CH}^{OC}, N_{CH}^{RS}\}\min\{5,6\}=5.$$

According to the channel index $n_{PUCCH}^{(3)}$, the location of the physical uplink control channel format 3 in the total physical uplink control channel areas as shown in FIG. 9 and the number of channels $N_{CH}$ of the physical uplink control channel format 3 which can be multiplexed within one resource block, the terminal determines a virtual frequency domain resource block index m of the physical uplink control channel format 3 by the following way:

$$m = N_{RB}^{(2)} + \left\lceil \frac{N_{CS}^{(1)}}{8} \right\rceil + \lfloor n_{PUCCH}^{(3)}/N_{CH} \rfloor, \quad (4\text{-}1)$$

the values are put into items to obtain m=4+1+0=5.

Then, according to a mapping relationship between the virtual frequency domain resource block index and a physical frequency domain resource block index as shown below, a physical frequency domain resource block index $n_{PRB}^{(3)}$ practically used when the physical uplink control channel format 3 is sent is obtained:

$$n_{PRB}^{(3)} = \begin{cases} \lfloor \frac{m}{2} \rfloor & \text{if } (m+n_s \bmod 2)\bmod 2 = 0 \\ N_{RB}^{UL} - 1 - \lfloor \frac{m}{2} \rfloor & \text{if } (m+n_s \bmod 2)\bmod 2 = 1 \end{cases}. \quad (4\text{-}2)$$

According to the channel index $n_{PUCCH}^{(3)}$ and the number of channels $N_{CH}$ of the physical uplink control channel format 3 which can be multiplexed within one resource block, the terminal determines a relative channel index $n'(n_s)$ ($n_s$ mod 2=0) of the channel index $n_{PUCCH}^{(3)}$ within one resource block on the first timeslot within a subframe by the following way:

$$n'(n_s)=\mod(n_{PUCCH}^{(3)}, N_{CH}) \quad (4\text{-}3),$$

the values are put into items to obtain $n'(n_s)=\mod(4, 5)=4$.

According to the $n'(n_s)$, the terminal determines a code domain resource of the physical uplink control channel format 3 by the following way, that is, a sequence index $(n_s)$ corresponding to the time domain spread sequence and a sequence index $n_{RS,CS}^{(3)}(n_s)$ corresponding to the reference signal sequence used when the physical uplink control channel format 3 is sent are:

$$\begin{cases} n_{OC}^{(3)}(n_s) = n'(n_s) \\ n_{RS,CS}^{(3)}(n_s) = n'(n_s) * \Delta_{shift}^{PUCCH} \end{cases}, \quad (4\text{-}4)$$

the values are put into items to obtain $$\begin{cases} n_{OC}^{(3)}(n_s) = n'(n_s) = 4 \\ n_{RS,CS}^{(3)}(n_s) = n'(n_s) * \Delta_{shift}^{PUCCH} = 8 \end{cases}.$$

Through the above process, the terminal determines a frequency domain resource and an initial code domain resource used when sending the physical uplink control channel format 3.

Furthermore, when the physical uplink control channel format 3 uses code resource hopping based on timeslots, a relative channel index $n'(n_s)(n_s \bmod 2=1)$ on the second timeslot of the subframe has a mapping relationship with the relative channel index $n'(n_s)(n_s \bmod 2=0)$ on the first timeslot, with the mapping relationship, the terminal obtains the relative index $n'(n_s)(n_s \bmod 2=1)$ on the second timeslot of the subframe, and then according to the formulas (4-4), it can obtain a time domain spread sequence used on the second timeslot and an initial value of cyclic shift amount used by a reference signal.

Furthermore, when the reference signal sequence uses cyclic shift hopping based on symbols, a sequence index $n_{RS,CS}^{(3)}(n_s,l)$ used by the reference signal sequence on each time domain symbol has a mapping relationship with $n_{RS,CS}^{(3)}(n_s)$ and with a cyclic shift hopping pattern based on symbols $n_{cs}(n_s,l)$, wherein l is an index of the reference signal corresponding to the time domain symbol within one timeslot, and after using the mapping relationship, the sequence index $n_{RS,CS}^{(3)}(n_s,l)$ used by the reference signal sequence on each time domain symbol can be obtained.

It can be seen from the example 4 that, in the above location relationship 3, the physical uplink control channel format 2/2a/2b and the hybrid resource block are identical with those of the LTE. With regard to the physical uplink control channel format 1/1a/1b, part of channel resource indexes corresponding to the physical uplink control channel format 1/1a/1b are configured according to the higher layer signaling, part of channel resource indexes corresponding to the physical uplink control channel format 1/1a/1b are acquired according to an implicit mapping relationship, and with regard to the part configured by the higher layer, the base station considers the existence of the physical uplink control channel format 3 during the configurations, thus it can be guaranteed that the channel indexes configured by the higher layer will not fall into the physical uplink control channel format 3 area during the channelization; and with regard to the case of obtaining by the implicit way, when the channel index $n_{PUCCH}^{(1)}$ of the physical uplink control channel format 1/1a/1b is calculated, a parameter $N_{PUCCH}^{(1)}$ configured by the higher layer is required, as long as the parameter $N_{PUCCH}^{(1)}$ is configured reasonably (that is, the existence of the physical uplink control channel format 3 is considered), the channel index $n_{PUCCH}^{(1)}$ of the physical uplink control channel format 1/1a/1b obtained by implicit mapping also will not conflict with the physical uplink control channel format 3. That is, through the existing configuration parameters of the LTE, the use of resource allocation method and channelization method of the present invention can be completely compatible with those of the LTE. It should be noted that, in this location relationship, channel indexes $n_{PUCCH}^{(1)}$ of the physical uplink control channel format 1/1a/1b are not successive.

Example 5

The example 5 is applied to a situation of the location relationship 4.

Figures 1, 10:
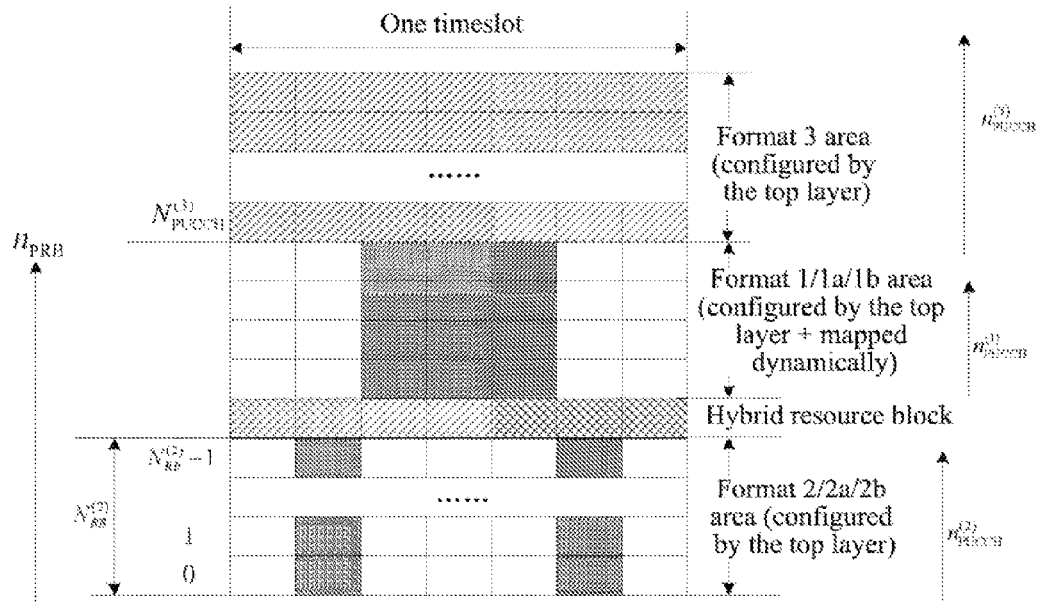
Figures 2, 10:
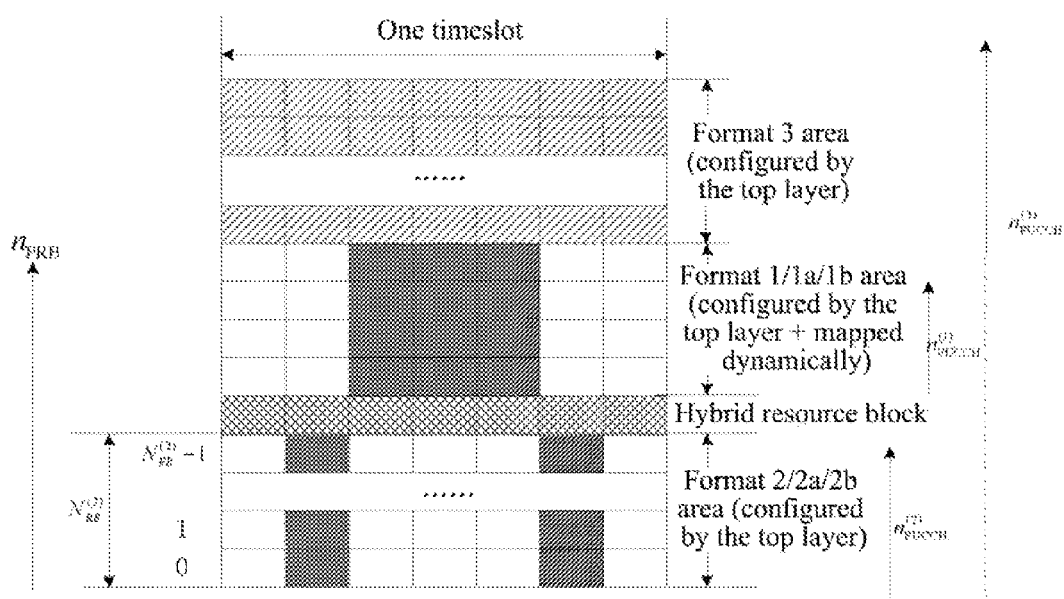

As shown in FIG. 10, a location of a physical uplink control channel format 3 in total physical uplink control channel areas can be of the above location relationship 4: from the bandwidth edge to the bandwidth center, being in turn a physical uplink control channel format 2/2a/2b area, a hybrid resource block (if configured), a physical uplink control channel format 1/1a/1b area and a physical uplink control channel format 3 area.

Meanwhile, it is assumed that the physical uplink control channel format 3 uses a frame structure with a normal cyclic prefix, a data-reference signal structure is a structure in which one timeslot contains 2 references signals, and the references signals do not use time domain spreading, and a truncated structure is not used at the same time.

Example 5-1

As shown in FIG. 10-1, in this location relationship, a base station configures the following relevant parameters for a terminal to perform the channelization of a physical uplink control channel format 3.

$N_{RB}^{(2)}$: it represents the number of physical resource blocks of a physical uplink control channel format 2/2a/2b, and it is assumed that $N_{RB}^{(2)}=4$ here.

$N_{CS}^{(1)}$: it represents the number of cyclic shifts used for sending a physical uplink control channel format 1/1a/1b in the hybrid resource block, and it is assumed that $N_{CS}^{(1)}=4$ here.

$\Delta_{shift}^{PUCCH}$: it represents a cyclic shift interval of a CG-CAZAC sequence, its values are 1, 2 and 3, and it is assumed that $\Delta_{shift}^{PUCCH}=2$ here.

$n_{PUCCH}^{(3)}$: it represents a channel index, used when the physical uplink control channel format 3 is sent, obtained by the terminal, and it is assumed that $n_{PUCCH}^{(3)}=4$ here.

$N_{PUCCH}^{(3)}$: it represents a start physical resource block index of the physical uplink control channel format 3 area on a frequency domain, and it is assumed that $N_{PUCCH}^{(3)}=9$ here.

In the assumed structure, a time domain spread sequence length of the physical uplink control channel format 3 is 5, thus the number of channels which can be multiplexed through a time domain spread sequence $N_{CH}^{OC}=5$, and the number of channels which can be multiplexed through a reference signal sequence $N_{CH}^{RS}=\lfloor 12/\Delta_{shift}^{PUCCH} \rfloor=6$; thus the number of channels of the physical uplink control channel format 3 which can be multiplexed within one resource block is:

$N_{CH}=\min\{N_{CH}^{OC}, N_{CH}^{RS}\}\min\{5,6\}=5.$

According to the channel index $n_{PUCCH}^{(3)}$, the location of the physical uplink control channel format 3 in the total physical uplink control channel areas as shown in FIG. 10-1 and the number of channels $N_{CH}$ of the physical uplink control channel format 3 which can be multiplexed within one resource block, the terminal determines a virtual frequency domain resource block index m of the physical uplink control channel format 3 by the following way:

$m=N_{PUCCH}^{(3)}+\lfloor n_{PUCCH}^{(3)}/N_{CH} \rfloor$ (5-1), the values are put into items to obtain m=9+⌊4/5⌋=9.

Then, according to a mapping relationship between the virtual frequency domain resource block index and a physical frequency domain resource block index as shown below, a physical frequency domain resource block index $n_{PRB}^{(3)}$ practically used when the physical uplink control channel format 3 is sent is obtained:

$$n_{PRB}^{(3)} = \begin{cases} \lfloor \frac{m}{2} \rfloor & \text{if } (m+n_s \bmod 2)\bmod 2 = 0 \\ N_{RB}^{UL}-1-\lfloor \frac{m}{2} \rfloor & \text{if } (m+n_s \bmod 2)\bmod 2 = 1 \end{cases}$$ (5-2)

According to the channel index $n_{PUCCH}^{(3)}$ and the number of channels $N_{CH}$ of the physical uplink control channel format 3 which can be multiplexed within one resource block, the terminal determines a relative channel index $n'(n_s)$ ($n_s$ mod 2=0) of the channel index $n_{PUCCH}^{(3)}$ within one resource block on the first timeslot within a subframe by the following way:

$n'(n_s)=\text{mod}(n_{PUCCH}^{(3)}, N_{CH})$ (5-3), the values are put into items to obtain $n'(n_s)$=mod(4, 5)=4.

According to the $n'(n_s)$, the terminal determines a code domain resource of the physical uplink control channel format 3 by the following way, that is, a sequence index $n_{OC}^{(3)}(n_s)$ corresponding to the time domain spread sequence and a sequence index $n_{RS,CS}^{(3)}(n_s)$ corresponding to the reference signal sequence used when the physical uplink control channel format 3 is sent are:

$$\begin{cases} n_{OC}^{(3)}(n_s) = n'(n_s) \\ n_{RS,CS}^{(3)}(n_s) = n'(n_s) * \Delta_{shift}^{PUCCH} \end{cases}$$ (5-4)

the values are put into items to obtain $$\begin{cases} n_{OC}^{(3)}(n_s) = n'(n_s) = 4 \\ n_{RS,CS}^{(3)}(n_s) = n'(n_s) * \Delta_{shift}^{PUCCH} = 8 \end{cases}.$$

Through the above process, the terminal determines a frequency domain resource and an initial code domain resource used when sending the physical uplink control channel format 3.

Furthermore, when the physical uplink control channel format 3 uses code resource hopping based on timeslots, a relative channel index $n'(n_s)$ ($n_s$ mod 2=1) on the second timeslot of the subframe has a mapping relationship with the relative channel index $n'(n_s)$ ($n_s$ mod 2=0) on the first timeslot, with the mapping relationship, the terminal obtains the relative index $n'(n_s)$ ($n_s$ mod 2=1) on the second timeslot of the subframe, and then according to the formulas (5-4), it can obtain a time domain spread sequence used on the second timeslot and an initial value of cyclic shift amount used by a reference signal.

Furthermore, when the reference signal sequence uses cyclic shift hopping based on symbols, a sequence index $n_{RS,CS}^{(3)}(n_s,l)$ used by the reference signal sequence on each time domain symbol has a mapping relationship with $n_{RS,CS}^{(3)}(n_s)$ and with a cyclic shift hopping pattern based on symbols $n_{cs}(n_s,l)$, wherein l is an index of the reference signal corresponding to the time domain symbol within one timeslot, and after using the mapping relationship, the sequence index $n_{RS,CS}^{(3)}(n_s,l)$ intended to be used by the reference signal sequence on each time domain symbol can be obtained.

Example 5-2

As shown in FIG. 10-2, in this location relationship, a base station configures the following relevant parameters for a terminal to perform the channelization of a physical uplink control channel format 3.

$N_{RB}^{(2)}$: it represents the number of physical resource blocks of a physical uplink control channel format 2/2a/2b, and it is assumed that $N_{RB}^{(2)}=4$ here.

$N_{CS}^{(1)}$: it represents the number of cyclic shifts used for sending a physical uplink control channel format 1/1a/1b in the hybrid resource block, and it is assumed that $N_{CS}^{(1)}=4$ here.

$\Delta_{shift}^{PUCCH}$: it represents a cyclic shift interval of a CG-CAZAC sequence, its values are 1, 2 and 3, and it is assumed that $\Delta_{shift}^{PUCCH}=2$ here.

$n_{PUCCH}^{(3)}$: it represents a channel index, used when the physical uplink control channel format 3 is sent, obtained by the terminal, and it is assumed that $n_{PUCCH}^{(3)}=46$ here.

In the assumed structure, a time domain spread sequence length of the physical uplink control channel format 3 is 5, thus the number of channels which can be multiplexed through a time domain spread sequence $N_{CH}^{OC}=5$, and the number of channels which can be multiplexed through a reference signal sequence $N_{CH}^{RS}=\lfloor 12/\Delta_{shift}^{PUCCH}\rfloor=6$; thus the number of channels of the physical uplink control channel format 3 which can be multiplexed within one resource block is:

$$N_{CH}=\min\{N_{CH}^{OC}, N_{CH}^{RS}\}\min\{5,6\}=5.$$

According to the channel index $n_{PUCCH}^{(3)}$, the location of the physical uplink control channel format 3 in the total physical uplink control channel areas shown in FIG. 10-2 and the number of channels $N_{CH}$ of the physical uplink control channel format 3 which can be multiplexed within one resource block, the terminal determines a virtual frequency domain resource block index m of the physical uplink control channel format 3 by the following way:

$$m=\lfloor n_{PUCCH}^{(3)}/N_{CH}\rfloor \quad (5\text{-}5),$$

the values are put into items to obtain $m=\lfloor 46/5 \rfloor=9$.

a calculation method for $m \to n_{pRB}$ is identical with that in the example 5-1;

$n'(n_s)(n_s \bmod 2=0)$, calculation methods for the $n_{OC}^{(3)}(n_s)$ and $n_{RS,CS}^{(3)}(n_s)$ are identical with those in the example 5-1, which will not be repeated here.

It can be seen from the examples 5-1 and 5-2 that, in the above location relationship 4, the physical uplink control channel format 1/1a/1b, the physical uplink control channel format 2/2a/2b and the hybrid resource block are identical with those of the LTE, thus the LTE can be completely compatible. However, one thing required to be pointed is that, with regard to the physical uplink control channel format 3, when the channel index of the physical uplink control channel format 3 or the higher layer parameter $N_{PUCCH}^{(3)}$ is configured, it is required to consider a dynamic area of the physical uplink control channel format 1/1a/1b, if the reserved resources are extremely few, it may make the physical uplink control channel format 3 fall into the dynamic area of the physical uplink control channel format 1/1a/1b, if the reserved resources are too many, the resources are wasted, and this configuration way goes against the original intention of designing the dynamic area of the physical uplink control channel format 1/1a/1b at the beginning. Therefore, the location relationship 4 is not a preferred scheme.

Moreover, in consideration of that, if the physical uplink control channel format 3 used for sending ACK/NACK message is placed at two sides of the bandwidth, the performance of the physical uplink control channel formats 3 will be influenced due to out-of-band leakage. Therefore, in comprehensive consideration for the influence on the existing physical uplink control channel formats and the performance of the physical uplink control channel formats 3, the location relationships 2 and 3 are preferred schemes.

Certainly, the present invention can still have other various examples, the skilled familiar with the art can make various corresponding changes and transformations according to the present document without departing from the spirit and essence of the present invention, and these corresponding changes and transformations shall all belong to the protection scope of the appended claims of the present document.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present invention is not limited to any combination of hardware and software in a specific form.

INDUSTRIAL APPLICABILITY

In the present invention, a feasible scheme is provided for determining resources of the physical uplink control channel format 3, which improves the system performance.

What is claimed is:

1. A method for determining physical uplink control channel resources, comprising:

a terminal determining a frequency domain resource and a code domain resource used when a physical uplink control channel format 3 is sent according to parameters configured by a base station;

wherein the physical uplink control channel format 3 is a format used in a long term evolution (LTE) communication system;

wherein the step of a terminal determining a frequency domain resource and a code domain resource used when a physical uplink control channel format 3 is sent according to parameters configured by a base station comprises:

the terminal obtaining a control channel index $n_{PUCCH}^{(3)}$, used when the physical uplink control channel format 3 is sent;

according to the control channel index $n_{PUCCH}^{(3)}$, the location of the physical uplink control channel format 3 in total physical uplink control channel areas and a number of channels $N_{CH}$ of the physical uplink control channel format 3 which can be multiplexed within one resource block, the terminal determining a virtual frequency domain resource block index m of the physical uplink control channel format 3;

according to a mapping relationship between the virtual frequency domain resource block index m and a physical frequency domain resource block index, the terminal obtaining a physical frequency domain resource block index $n_{PRB}^{(3)}$, practically used when the physical uplink control channel format 3 is sent;

according to the control channel index $n_{PUCCH}^{(3)}$ and the number of channels $N_{CH}$ of the physical uplink control channel format 3 which can be multiplexed within one resource block, the terminal determining a relative channel index $n'(n_s)(n_s \bmod 2=0)$ of the channel index $n_{PUCCH}^{(3)}$ within one resource block on a first timeslot within a subframe; and according to the $n'(n_s)$, the terminal determining the code domain resource of the physical uplink control channel format 3, namely a sequence index $n_{OC}^{(3)}(n_s)$ corresponding to a time domain spread sequence and a sequence index $n_{RS,CS}^{(3)}(n_s)$ corresponding to a reference signal sequence used when the physical uplink control channel format 3 is sent.

2. The method according to claim 1, wherein,
the frequency domain resource used by the physical uplink control channel format 3 is a location of the physical uplink control channel format 3 in total physical uplink control channel areas; and the location is determined according to one of following 5 location relationships:

location relationship 1: the total physical uplink control channel areas comprising a physical uplink control channel format 3 area, a physical uplink control channel format 2 or 2a or 2b area, a hybrid resource block and a physical uplink control channel format 1 or 1a or 1b area, which are located in sequence from a bandwidth edge to a bandwidth center;

location relationship 2: the total physical uplink control channel areas comprising a physical uplink control channel format 2 or 2a or 2b area, a physical uplink control channel format 3 area, a hybrid resource block and a physical uplink control channel format 1 or 1a or 1b area, which are located in sequence from a bandwidth edge to a bandwidth center;

location relationship 3: the total physical uplink control channel areas comprising a physical uplink control channel format 2 or 2a or 2b area, a hybrid resource block, a physical uplink control channel format 3 area and a physical uplink control channel format 1 or 1a or 1b area, which are located in sequence from a bandwidth edge to a bandwidth center;

location relationship 4: the total physical uplink control channel areas comprising a physical uplink control channel format 2 or 2a or 2b area, a hybrid resource block, a physical uplink control channel format 1 or 1a or 1b area and a physical uplink control channel format 3 area, which are located in sequence from a bandwidth edge to a bandwidth center;

location relationship 5: the total physical uplink control channel areas comprising an area in which the physical uplink control channel format 3 and a physical uplink control channel format 2 or 2a or 2b appear alternately, a hybrid resource block and a physical uplink control channel format 1 or 1a or 1b, which are located in sequence from a bandwidth edge to a bandwidth center;

wherein, in a case that no hybrid resource block resource is configured, the hybrid resource block is not contained in the above location relationships.

3. The method according to claim 1, wherein,
a value of the number of channels $N_{CH}$ of the physical uplink control channel format 3 which can be multiplexed within one resource block is related to a number of channels $N_{CH}^{OC}$ which can be multiplexed through the time domain spread sequence and a number of channels $N_{CH}^{RS}$ which can be multiplexed through the reference signal sequence.

4. The method according to claim 3, wherein,
the value of the $N_{CH}$ is a minimum of the $N_{CH}^{OC}$ and the $N_{CH}^{RS}$.

5. The method according to claim 3, wherein,
the number of channels $N_{CH}^{RS}$ which can be multiplexed through the reference signal sequence is related to a cyclic shift interval $\Delta_{shift}^{PUCCH}$ used by the reference signal sequence configured by the base station currently;

or, when the reference signal sequence uses a time domain spreading, the number of channels $N_{CH}^{RS}$ which can be multiplexed through the reference signal sequence is related to a cyclic shift interval $\Delta_{shift}^{PUCCH}$ used by the reference signal sequence configured by the base station currently and a time domain spread sequence length of the reference signal.

6. The method according to claim 5, wherein,
when the number of channels $N_{CH}^{RS}$ which can be multiplexed through the reference signal sequence is related to the cyclic shift interval $\Delta_{shift}^{PUCCH}$ used by the reference signal sequence configured by the base station currently, $N_{CH}^{RS}=\lfloor 12/\Delta_{shift}^{PUCCH} \rfloor$;

when the reference signal sequence uses the time domain spreading, and the number of channels $N_{CH}^{RS}$ which can be multiplexed through the reference signal sequence is related to the cyclic shift interval $\Delta_{shift}^{PUCCH}$ used by the reference signal sequence configured by the base station currently and the time domain spread sequence length of the reference signal, $N_{CH}^{RS}=\lfloor 12/\Delta_{shift}^{PUCCH} \rfloor * N_{RS,OC}^{(3)}$; wherein $n_{RS,OC}^{(3)}$ is the time domain spread sequence length of the reference signal, or, the time domain spread sequence length of the reference signal is related to a reference signal structure used by the physical uplink control channel format 3.

7. The method according to claim 6, wherein,
the time domain spread sequence length of the reference signal is equal to a time domain spread sequence length of a reference signal used by the physical uplink control channel format 3.

8. The method according to claim 1, wherein,
when the physical uplink control channel format 3 uses code resource hopping based on timeslots, a relative channel index $n'(n_s)(n_s \bmod 2=1)$ on a second timeslot of the subframe has a mapping relationship with a relative channel index $n'(n_s)(n_s \bmod 2=0)$ on the first timeslot; and when the physical uplink control channel format 3 does not use the code resource hopping based on timeslots, the relative channel index $n'(n_s)(n_s \bmod 2=1)$ on the second timeslot of the subframe is equal to the relative channel index $n'(n_s)(n_s \bmod 2=0)$ on the first timeslot, or, when the reference signal sequence uses cyclic shift hopping based on symbols, a sequence index used by the reference signal sequence on each time domain symbol has a mapping relationship with $n_{RS,CS}^{(3)}(n_s)$ and with a cyclic shift hopping pattern based on symbols $n_{cs}(n_s,l)$, wherein l is an index of the reference signal corresponding to the time domain symbol within one timeslot; and when the reference signal sequence does not use the cyclic shift hopping based on symbols, the sequence index used by the reference signal sequence on each time domain symbol is the $n_{RS,CS}^{(3)}(n_s)$, or, the control channel index $n_{PUCCH}^{(3)}$ used when the terminal sends the physical uplink control channel format 3 is obtained by means of higher layer signaling configuration, or is obtained by means of implicit indication, or is obtained by means of explicit indication of downlink control information.

9. A method for determining physical uplink control channel resources, comprising:

a terminal determining a frequency domain resource, namely a location of a physical uplink control channel format 3 in total physical uplink control channel areas, used when the physical uplink control channel format 3 is sent according to parameters configured by a base station, wherein the location is determined according to one of following 5 location relationships:

location relationship 1: the total physical uplink control channel areas comprising a physical uplink control channel format 3 area, a physical uplink control channel format 2 or 2a or 2b area, a hybrid resource block and a physical uplink control channel format 1 or 1a or 1b area, which are located in sequence from a bandwidth edge to a bandwidth center;

location relationship 2: the total physical uplink control channel areas comprising a physical uplink control channel format 2 or 2a or 2b area, a physical uplink control channel format 3 area, a hybrid resource block and a physical uplink control channel format 1 or 1a or 1b area, which are located in sequence from a bandwidth edge to a bandwidth center;

location relationship 3: the total physical uplink control channel areas comprising a physical uplink control channel format 2 or 2a or 2b area, a hybrid resource block, a physical uplink control channel format 3 area and a physical uplink control channel format 1 or 1a or 1b area, which are located in sequence from a bandwidth edge to a bandwidth center;

location relationship 4: the total physical uplink control channel areas comprising a physical uplink control channel format 2 or 2a or 2b area, a hybrid resource block, a physical uplink control channel format 1 or 1a or 1b area and a physical uplink control channel format 3 area, which are located in sequence from a bandwidth edge to a bandwidth center;

location relationship 5: the total physical uplink control channel areas comprising an area in which the physical uplink control channel format 3 and a physical uplink control channel format 2 or 2a or 2b appear alternately, a hybrid resource block and a physical uplink control channel format 1 or 1a or 1b area, which are located in sequence from a bandwidth edge to a bandwidth center;

wherein the physical uplink control channel format 1 or 1a or 1b, the physical uplink control channel format 2 or 2a or 2b, and the physical uplink control channel format 3 are a format used in a long term evolution (LTE) communication system;

the method further comprises the terminal determining a virtual frequency domain resource block index m of the physical uplink control channel format 3; wherein, when the base station configures $N_{RB}^{(3)}$, $m = N_{RB}^{(2)} - N_{RB}^{(3)} + \lfloor n_{PUCCH}^{(3)}/N_{CH} \rfloor$;

when the base station configures $N_{PUCCH}^{(3)}$, $m = N_{PUCCH}^{(3)} \lfloor n_{PUCCH}^{(3)} + /N_{CH} \rfloor$;

when the base station does not configure the $N_{RB}^{(3)}$ and $N_{PUCCH}^{(3)}$, $m = N_{RB}^{(2)}$ $1 - \lfloor n_{\overline{PUCCH}}^{(3)}/N_{CH} \rfloor$ or $m = \lfloor n_{PUCCH}^{(3)}/N_{CH} \rfloor$ or $$m = N_{RB}^{(2)} + \left\lceil \frac{N_{CS}^{(1)}}{8} \right\rceil + \lfloor n_{PUCCH}^{(3)}/N_{CH} \rfloor;$$

wherein, $N_{RB}^{(2)}$ represents a total number of physical resource blocks occupied by a physical uplink control channel format 2 or 2a or 2b and the physical uplink control channel format 3, or $N_{RB}^{(2)}$ represents a number of physical resource blocks occupied by the physical uplink control channel format 2 or 2a or 2b;

$N_{RB}^{(3)}$ represents a number of physical resource blocks occupied by the physical uplink control channel format 3; $n_{PUCCH}^{(3)}$ represents a channel index, used when the physical uplink control channel format 3 is sent, obtained by the terminal;

$N_{CH}$ represents a number of channels of the physical uplink control channel format 3 which can be multiplexed within one resource block; $N_{PUCCH}^{(3)}$ represents a start physical resource block index of the physical uplink control channel format 3 area in a frequency domain; and $N_{CS}^{(1)}$ represents a number of cyclic shifts used for sending a physical uplink control channel format 2 or 2a or 2b in the hybrid resource block.

10. The method according to claim 9, further comprising:

according to a mapping relationship between the virtual frequency domain resource block index m and a physical frequency domain resource block index, the terminal obtaining a physical frequency domain resource block index $n_{PRB}^{(3)}$ practically used when the physical uplink control channel format 3 is sent, when a value of $m + n_s$ mod 2 is an integral multiple of 2, $$n_{PRB}^{(3)} = \left\lfloor \frac{m}{2} \right\rfloor,$$

and when the value of $m + n_s$ mod 2 is not an integral multiple of 2, $$n_{PRB}^{(3)} = N_{RB}^{UL} - 1 - \left\lfloor \frac{m}{2} \right\rfloor,$$

wherein, mod represents modular arithmetic, and $N_{RB}^{UL}$ represents a number of physical resource blocks contained in uplink bandwidth.

11. The method according to claim 9, further comprising:

the terminal determining a code domain resource used when the physical uplink control channel format 3 is sent;

the step of the terminal determining a code domain resource used when the physical uplink control channel format 3 is sent comprising: according to the number of channels $N_{CH}$ of the physical uplink control channel format 3 which can be multiplexed within one resource block, the terminal determining a relative channel index $n'(n_s)(n_s \mod 2=0)$ of the channel index $n_{PUCCH}^{(3)}$ within one resource block on a first timeslot within a subframe, which is specifically as follows: $n'(n_s)=\mod (n_{PUCCH}^{(3)}, N_{CH})$, and $N_{CH}$ represents the number of channels of the physical uplink control channel format 3 which can be multiplexed within one resource block.

12. The method according to claim 11, wherein:
the step of the terminal determining a code domain resource used when the physical uplink control channel format 3 is sent further comprises: according to the n'($n_s$), the terminal determining the code domain resource of the physical uplink control channel format 3, namely a sequence index $n_{OC}^{(3)}(n_s)$ corresponding to a time domain spread sequence and a sequence index $n_{RS,CS}^{(3)}(n_s)$ corresponding to a reference signal sequence used when the physical uplink control channel format 3 is sent, wherein a value of the $n_{OC}^{(3)}(n_s)$ is equal to the value of the n'($n_s$), a value of the $n_{RS,CS}^{(3)}(n_s)$ is a product of the n'($n_s$) and $\Delta_{shift}^{PUCCH}$, the $\Delta_{shift}^{PUCCH}$ represents a cyclic shift interval of a constant amplitude zero auto-correlation sequence, and values of the $\Delta_{shift}^{PUCCH}$ are 1, 2 and 3.

13. A system for determining physical uplink control channel resources, comprising:
a terminal, configured to determine a frequency domain resource, namely a location of a physical uplink control channel format 3 in total physical uplink control channel areas, used when the physical uplink control channel format 3 is sent according to parameters configured by a base station, wherein the location is determined according to one of following 3-5 location relationships:
location relationship 1: the total physical uplink control channel areas comprising a physical uplink control channel format 3 area, a physical uplink control channel format 2 or 2a or 2b area, a hybrid resource block and a physical uplink control channel format 1 or 1a or 1b area, which are located in sequence from a bandwidth edge to a bandwidth center;
location relationship 2: the total physical uplink control channel areas comprising a physical uplink control channel format 2 or 2a or 2b area, a physical uplink control channel format 3 area, a hybrid resource block and a physical uplink control channel format 1 or 1a or 1b area, which are located in sequence from a bandwidth edge to a bandwidth center;
location relationship 3: the total physical uplink control channel areas comprising a physical uplink control channel format 2 or 2 or 2a or 2b area, a hybrid resource block, a physical uplink control channel format 3 area and a physical uplink control channel format 1 or 1a or 1b area, which are located in sequence from a bandwidth edge to a bandwidth center;
location relationship 4: the total physical uplink control channel areas comprising a physical uplink control channel format 2 or 2a or 2b area, a hybrid resource block, a physical uplink control channel format 1 or 1a or 1b area and a physical uplink control channel format 3 area, which are located in sequence from a bandwidth edge to a bandwidth center;
location relationship 5: the total physical uplink control channel areas comprising an area in which the physical uplink control channel format 3 and a physical uplink control channel format 2 or 2a or 2b appear alternately, a hybrid resource block and a physical uplink control channel format 1 or 1a or 1b area, which are located in sequence from a bandwidth edge to a bandwidth center;
wherein the physical uplink control channel format 1 or 1a or 1b, the physical uplink control channel format 2 or 2a or 2b, and the physical uplink control channel format 3 are a format used in a long term evolution (LTE) communication system;

the terminal is further configured to determine a virtual frequency domain resource block index m of the physical uplink control channel format 3; wherein,
when the base station configures $N_{RB}^{(3)}$, m=$N_{RB}^{(2)}$−$N_{RB}^{(3)}$+$\lfloor n_{PUCCH}^{(3)}/N_{CH} \rfloor$;
when the base station configures $N_{PUCCH}^{(3)}$, m= $N_{PUCCH}^{(3)}\lfloor n_{PUCCH}^{(3)}+/N_{CH} \rfloor$;
when the base station does not configure the $N_{RB}^{(3)}$ and $N_{PUCCH}^{(3)}$, m=$N_{RB}^{(2)}$ 1−$\lfloor n_{PUCCH}^{(3)}/N_{CH} \rfloor$ or m=$\lfloor n_{PUCCH}^{(3)}/N_{CH} \rfloor$ or $$m = N_{RB}^{(2)} + \left\lceil \frac{N_{CS}^{(1)}}{8} \right\rceil + \lfloor n_{PUCCH}^{(3)}/N_{CH} \rfloor;$$

wherein, $N_{RB}^{(2)}$ represents a total number of physical resource blocks occupied by a physical uplink control channel format 2 or 2a or 2b and the physical uplink control channel format 3, or $N_{RB}^{(2)}$ represents a number of physical resource blocks occupied by the physical uplink control channel format 2 or 2a or 2b;
$N_{RB}^{(3)}$ represents a number of physical resource blocks occupied by the physical uplink control channel format 3; $n_{PUCCH}^{(3)}$ represents a channel index, used when the physical uplink control channel format 3 is sent, obtained by the terminal;
$N_{CH}$ represents a number of channels of the physical uplink control channel format 3 which can be multiplexed within one resource block; $N_{PUCCH}^{(3)}$ represents a start physical resource block index of the physical uplink control channel format 3 area in a frequency domain; and
$N_{CS}^{(1)}$ represents a number of cyclic shifts used for sending a physical uplink control channel format 1 or 1a or 1b in the hybrid resource block.

14. The system according to claim 13, wherein:
the terminal is further configured to: according to a mapping relationship between the virtual frequency domain resource block index m and a physical frequency domain resource block index, obtain a physical frequency domain resource block index $n_{PRB}^{(3)}$ practically used when the physical uplink control channel format 3 is sent, when a value of m+$n_s$ mod 2 is an integral multiple of 2, $$n_{PRB}^{(3)} = \left\lfloor \frac{m}{2} \right\rfloor,$$

and when the value of m+$n_s$ mod 2 is not an integral multiple of 2, $$n_{PRB}^{(3)} = N_{RB}^{UL} - 1 - \left\lfloor \frac{m}{2} \right\rfloor,$$

wherein, mod represents modular arithmetic, and $N_{RB}^{UL}$ represents a number of physical resource blocks contained in uplink bandwidth.

15. The system according to claim 13, wherein:
the terminal is further configured to: according to the number of channels $N_{CH}$ of the physical uplink control channel format 3 which can be multiplexed within one resource block, determine a relative channel index n'($n_s$) ($n_s$ mod 2=0) of the channel index $n_{PUCCH}^{(3)}$ within one resource block on a first timeslot within a subframe, which is specifically as follows: $n'(n_s) = \text{mod}(n_{PUCCH}^{(3)}, N_{CH})$, and $N_{CH}$ represents the number of channels of the physical uplink control channel format 3 which can be multiplexed within one resource block.

16. The system according to claim 15, wherein:
the terminal is further configured to: according to the $n'(n_s)$, determine the code domain resource of the physical uplink control channel format 3, namely a sequence index $n_{OC}^{(3)}(n_s)$ corresponding to a time domain spread sequence and a sequence index $n_{RS,CS}^{(3)}(n_s)$ corresponding to a reference signal sequence used when the physical uplink control channel format 3 is sent, a value of the $n_{OC}^{(3)}(n_s)$ is equal to the value of the $n'(n_s)$, a value of the $n_{RS,CS}^{(3)}(n_s)$ is a product of the $n'(n_s)$ and $\Delta_{shift}^{PUCCH}$, the $\Delta_{shift}^{PUCCH}$ represents a cyclic shift interval of a constant amplitude zero auto-correlation sequence, and values of the $\Delta_{shift}^{PUCCH}$ are 1, 2 and 3.

* * * * *